(12) United States Patent
Yoneda et al.

(10) Patent No.: US 9,194,757 B2
(45) Date of Patent: Nov. 24, 2015

(54) MAGNETOSTRICTIVE TORQUE SENSOR AND ELECTRIC POWER STEERING DEVICE

(71) Applicant: HONDA MOTOR CO., LTD., Tokyo (JP)

(72) Inventors: Atsuhiko Yoneda, Wako (JP); Yasuo Shimizu, Wako (JP); Kouichi Fujita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/263,217

(22) Filed: Apr. 28, 2014

(65) Prior Publication Data
US 2014/0326077 A1 Nov. 6, 2014

(30) Foreign Application Priority Data
May 1, 2013 (JP) ................................. 2013-096520

(51) Int. Cl.
*G01L 3/02* (2006.01)
*G01L 3/10* (2006.01)
*B62D 5/04* (2006.01)

(52) U.S. Cl.
CPC . *G01L 3/102* (2013.01); *B62D 5/04* (2013.01); *G01L 3/105* (2013.01)

(58) Field of Classification Search
CPC ...... G01L 3/102; G01L 3/105; B62D 5/0481; B62D 5/04
USPC ....................................... 73/862.331–862.335
See application file for complete search history.

(56) References Cited

U.S. PATENT DOCUMENTS

| | | | |
|---|---|---|---|
| 2004/0187605 A1* | 9/2004 | Naidu et al. ............. | 73/862.331 |
| 2006/0179959 A1* | 8/2006 | Ouyang et al. ............ | 73/862.331 |
| 2008/0314163 A1* | 12/2008 | Harata et al. ............. | 73/862.333 |
| 2009/0128081 A1* | 5/2009 | Yoneda et al. ................ | 318/689 |

FOREIGN PATENT DOCUMENTS

JP 4581002 B2 11/2010

* cited by examiner

*Primary Examiner* — Max Noori
(74) *Attorney, Agent, or Firm* — Westerman, Hattori, Daniels & Adrian, LLP

(57) ABSTRACT

A magnetostrictive torque sensor includes first to fourth detection coils each wound around a steering axle (a sensor shaft) so as to surround a magnetostrictive film formed on the sensor shaft and a multi-turn winding bias coil that is separated from the first to fourth detection coils and that is wound around the sensor shaft so as to surround the magnetostrictive film. By applying a DC component current to the bias coil, a sufficient bias magnetic field is applied to the magnetostrictive film so that the hysteresis is prevented.

9 Claims, 23 Drawing Sheets

NO ANISOTROPY
(TORQUE Ts=0)

ANISOTROPY Ta ADDED
(TORQUE Ts=0)

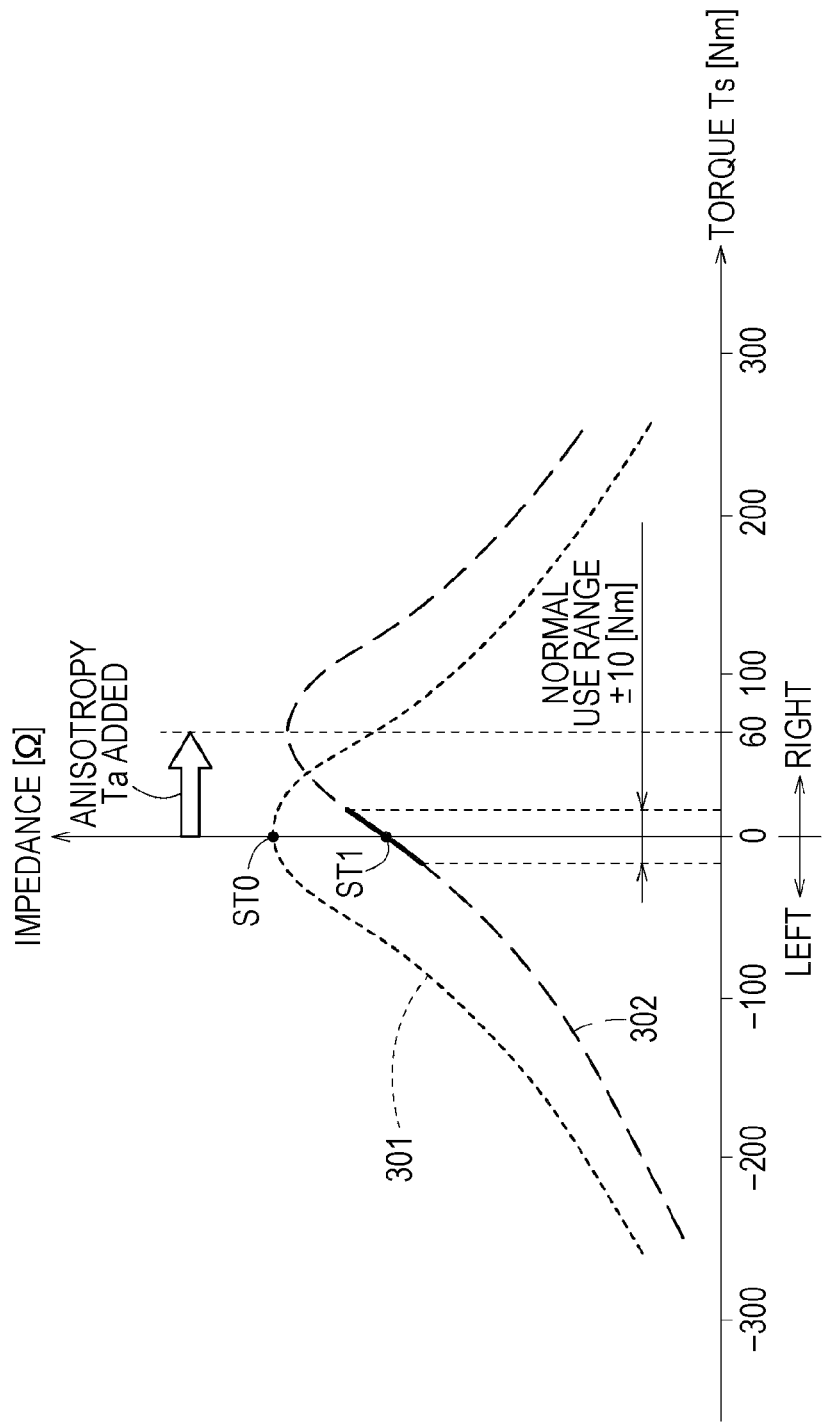

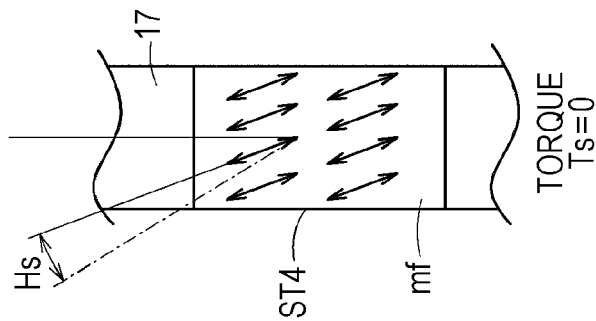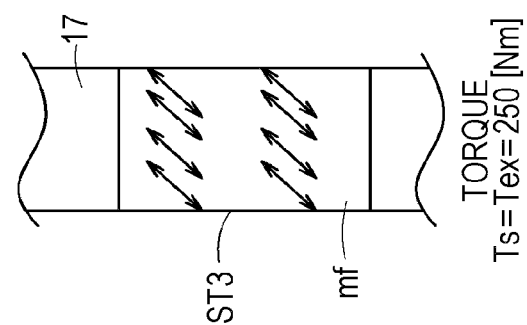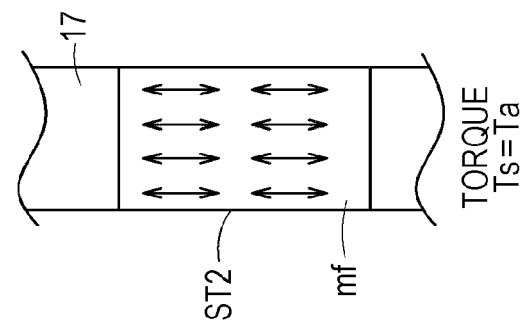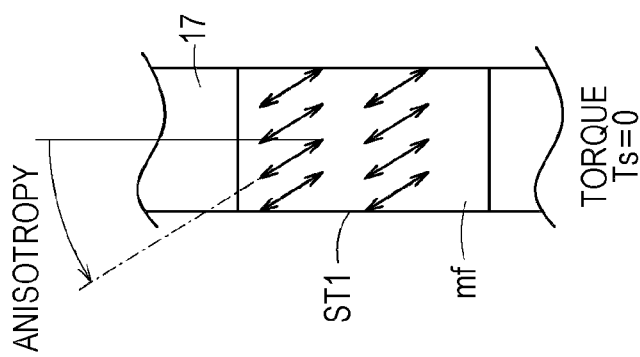

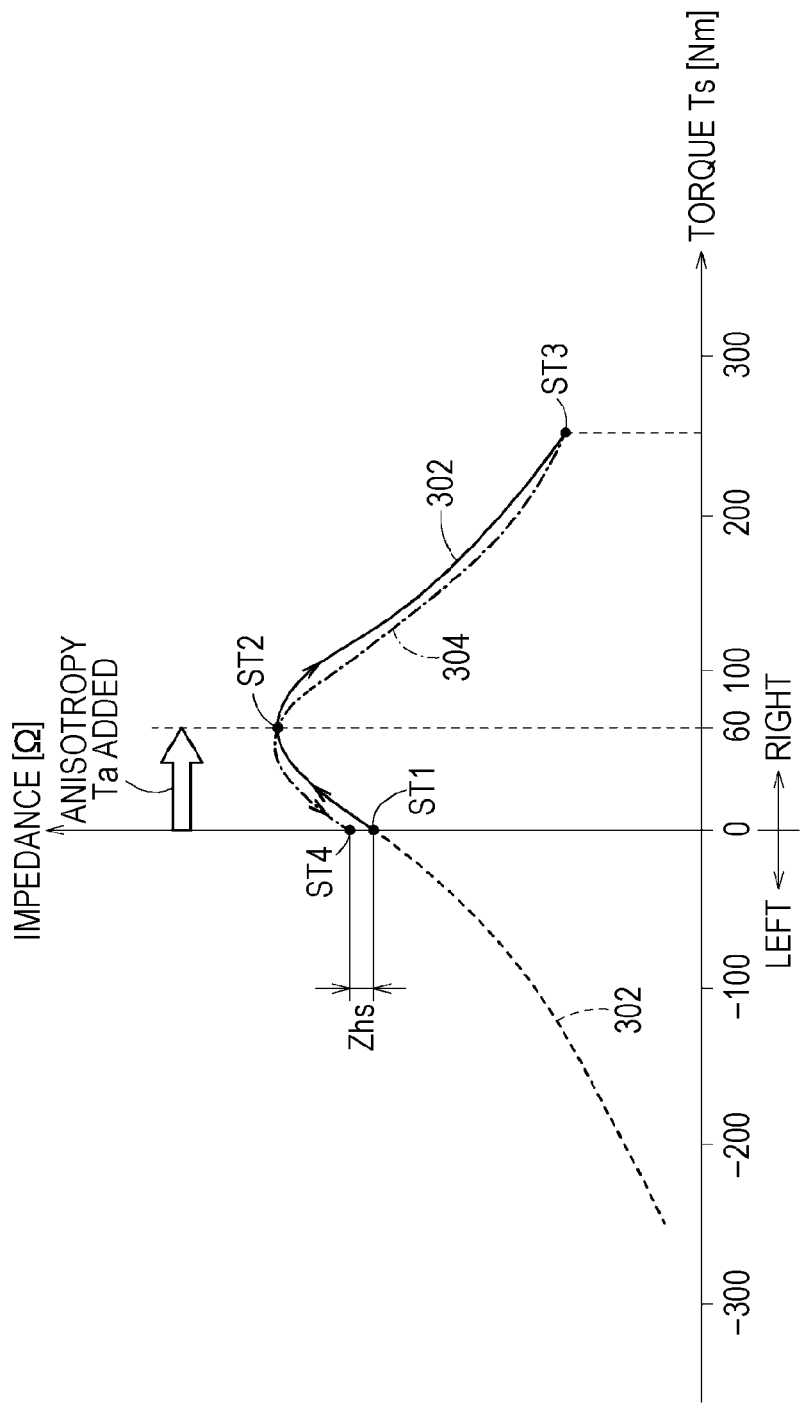

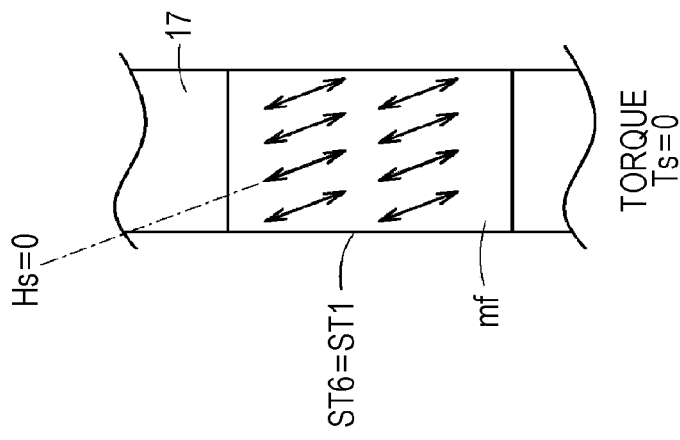
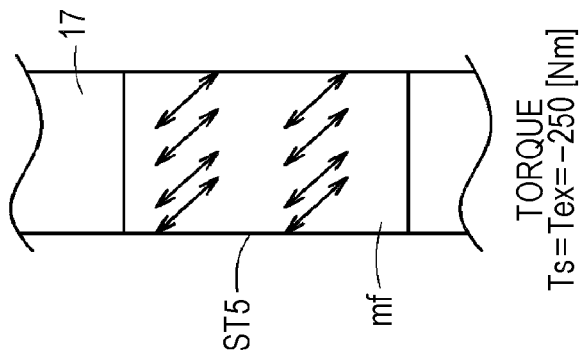
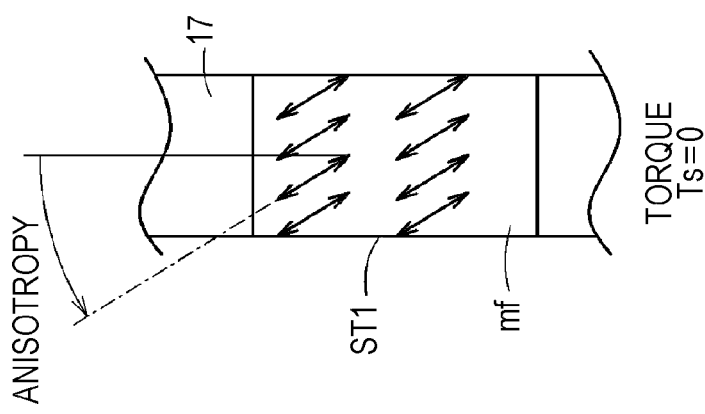

MAGNETOSTRICTIVE TORQUE SENSOR AND ELECTRIC POWER STEERING DEVICE

CROSS REFERENCES TO RELATED APPLICATIONS

The present application claims priority under 35 U.S.C. §119 to Japanese Patent Application No. 2013-96520, filed May 1, 2013, entitled "Magnetostrictive Torque Sensor and Electric Power Steering Device." The contents of this application are incorporated herein by reference in their entirety.

TECHNICAL FIELD

The present disclosure relates to a magnetostrictive torque sensor that detects torque on the basis of a variation of the magnetic property caused by the inverse magnetostrictive effect and an electric power steering device using the magnetostrictive torque sensor.

BACKGROUND

A magnetostrictive torque sensor is suitably used for, for example, electric power steering (EPS) devices that transfer the power of an electric motor (hereinafter also simply referred to as a "motor") to a steering system as an auxiliary steering force (a steering assist force) when a vehicle is steered using an operation member, such as a steering wheel in order to reduce the load imposed on a driver who operates the operating member (i.e., the steering load).

Such a magnetostrictive torque sensor used for the electric power steering device is described in, for example, Japanese Patent No. 4581002 (FIG. 2) filed by the present applicant. The magnetostrictive torque sensor employs NiFe plating as a magnetostrictive film.

As illustrated in FIG. 24, a magnetostrictive torque sensor 310 is formed by plating a Ni65[%]-Fe35[%] plating film (Ni Fe plating film) having a thickness of about 30 to about 40 µm on a sensor shaft 317, which is a shaft member formed by heat-processing a steel, such as S45C or SCM420, first. Thus, a magnetostrictive film mf is provided on the sensor shaft 317. Thereafter, a rotational torque is applied to the sensor shaft 317 in one direction, and the magnetostrictive film mf is heated by radio-frequency heating. After the magnetostrictive film mf is cooled, the rotational torque is removed so that anisotropy (magnetic anisotropy) ma1 is added. Subsequently, a rotational torque is applied in the opposite direction, and the other part of the sensor shaft 317 is heated by radio-frequency heating. After the part of the sensor shaft 317 is cooled, the rotational torque is removed so that anisotropy ma2 in a different direction is added.

Subsequently, a first detection coil 341 and a second detection coil 342 are wound around part of the magnetostrictive film mf having the anisotropy ma1 added thereto, and a third detection coil 343 and a fourth detection coil 344 are wound around part of the magnetostrictive film mf having the anisotropy ma2 added thereto.

The first detection coil 341 to the fourth detection coil 344 are connected to an interface circuit 320 serving as a torque detection circuit. The first detection coil 341 and the third detection coil 343 are connected in series. The first detection coil 341 is connected to a direct current voltage supply Vcc (the voltage is also referred to as "Vcc") via a damping resistor Rd (the resistance value is also referred to as "Rd"). The third detection coil 343 is connected to a switching element 334 via a damping resistor Re (the resistance value is also referred to as "Re"). In addition, a free wheel diode 336 is provided. The free wheel diode 336 has an anode terminal connected to a connection point between the damping resistor Re and the switching element 334 and a cathode terminal connected to the direct current voltage supply Vcc.

An alternating current is applied to the first detection coil 341 and the third detection coil 343 by driving the switching element 334 using a square wave signal PVF. In such a case, by applying a steering torque from a steering wheel (not illustrated) to the sensor shaft 317, the magnetic permeability of each of the portions of the magnetostrictive film mf having the anisotropy ma1 and the anisotropy ma2 added thereto varies and, thus, the inductance of each of the first detection coil 341 and the third detection coil 343 varies. For example, the inductance of the first detection coil 341 increases, whereas the inductance of the third detection coil 343 decreases.

At that time, the same alternating current flows through the first detection coil 341 and the third detection coil 343. Accordingly, a divided voltage V1 generated by a voltage caused by the product of the inductance of the first detection coil 341 and an electric current variation and a voltage caused by the product of the inductance of the third detection coil 343 and the electric current variation appears at a middle point 351 between the first detection coil 341 and the third detection coil 343 (the divided voltage V1 is also referred to as a "middle point voltage"). The middle point voltage V1 of the middle point between the first detection coil 341 and the third detection coil 343 is held by a bottom hold circuit 331 and is amplified. In this manner, an output voltage VT1 can be obtained.

Similarly, the second detection coil 342 and the fourth detection coil 344 are connected in series. The fourth detection coil 344 is connected to the direct current voltage supply Vcc via the damping resistor Rd, and the second detection coil 342 is connected to the switching element 334 via the damping resistor Re. An alternating current is applied to the second detection coil 342 and the fourth detection coil 344 by driving the switching element 334 using the square wave signal PVF. In such a case, by applying the steering torque from the steering wheel (not illustrated) to the sensor shaft 317, the magnetic permeability of the portions of the magnetostrictive film mf having the anisotropy ma1 and the anisotropy ma2 added thereto varies and, thus, the inductance of each of the second detection coil 342 and the fourth detection coil 344 varies. For example, the inductance of the second detection coil 342 increases, whereas the inductance of the fourth detection coil 344 decreases.

At that time, the same alternating current flows through the second detection coil 342 and the fourth detection coil 344. Accordingly, a divided voltage V2 (a middle point voltage V2) generated by a voltage caused by the product of the inductance of the fourth detection coil 344 and an electric current variation and a voltage caused by the product of the inductance of the second detection coil 342 and the electric current variation appears at a middle point 352 between the second detection coil 342 and the fourth detection coil 344. The middle point voltage V2 of the middle point between the second detection coil 342 and the fourth detection coil 344 is held by a bottom hold circuit 332 and is amplified. In this manner, an output voltage VT2 can be obtained.

In addition, an output voltage, which is a differential output of a differential amplifier 333 generated from the output voltage VT1 and the output voltage VT2, is obtained as a steering torque signal VT3. Thereafter, a target electric current to be applied to a steering assist motor (not illustrated) is calculated on the basis of the steering torque signal VT3.

Furthermore, malfunction is detected using the output voltage VT1 and the output voltage VT2. More specifically, if the sum voltage of the output voltage VT1 and the output voltage VT2 is outside a predetermined voltage range, it is determined that the magnetostrictive torque sensor 310 malfunctions.

SUMMARY

The inventors found that, if a wheel of an automobile having the electric power steering device using the magnetostrictive torque sensor 310 according to the existing technology hits a curb during its travel, an excessive torsion torque that significantly exceeds steering torque during normal driving (hereinafter referred to as an "excessive torsion torque Tex" or simply referred to as an "excessive torque Tex") is applied to the steering axle (the sensor shaft 317).

The inventors found that, in the magnetostrictive torque sensor 310 according to an existing technology, when the steering axle (the sensor shaft 317) returns to a mode in which the excessive torque Tex is removed from the steering axle, a large hysteresis voltage (hereinafter referred to as "Vhs") may occur at the middle point voltages V1 and V2 representing the sensor outputs.

To address such an issue, the present application provides a magnetostrictive torque sensor capable of preventing the hysteresis occurring in a steering torque signal output from the sensor even when an excessive torsion torque (an excessive torque) is applied to a shaft member (a steering axle, a sensor shaft) and provides an electric power steering device using the magnetostrictive torque sensor.

According to an embodiment of the present disclosure, a magnetostrictive torque sensor includes a shaft member having a magnetostrictive film formed thereon, where the magnetostrictive film has magnetic anisotropy, a plurality of multi-turn winding detection coils each wound around the shaft member so as to surround the magnetostrictive film, where the detection coil excites the magnetostrictive film when an AC component current is applied thereto and detects a variation of a magnetic property of the magnetostrictive film that varies in accordance with a torque applied to the shaft member, and a multi-turn winding bias coil wound around the shaft member so as to surround the magnetostrictive film, where the bias coil is separated from the detection coils. When the AC component current is applied to the detection coils, a DC component current is applied to the bias coil so that a bias magnetic field is applied to the magnetostrictive film.

Here, the DC component current may be one of an average electric current obtained when an inductive current and a freewheeling current are alternately applied to the bias coil and a direct current.

In addition to the detection coils that are wound around the shaft member so as to surround the magnetostrictive film formed on the shaft member, a DC component current is applied to another multi-turn winding coil that is wound around the shaft member so as to surround the magnetostrictive film to serve as the bias coil. The bias magnetic field is applied to the magnetostrictive film using the bias coil. Accordingly, a decrease in the detection sensitivity caused by an increase in the direct current resistive component of the detection coils of the magnetostrictive torque sensor according to existing technology in which the detection coils are also used as a bias coil can be prevented. Thus, a sufficient bias magnetic field can be applied to the magnetostrictive film.

Since a decrease in the detection sensitivity is minimized in this manner, the S/N ratio does not decrease. In addition, since a sufficient bias magnetic field can be applied, the hysteresis of the sensor output occurring when the excessive input torque is applied can be reduced. As a result, the magnetostrictive torque sensor having high detection accuracy without a variation in the sensor output even when the excessive input torque is applied due to a disturbance can be provided.

One end of the bias coil can be connected to positive electrode potential of a direct current power supply that generates a direct current voltage defined by a negative electrode potential and the positive electrode potential, and the other end can be connected to one end of a switching element connected to the positive electrode potential via a free wheel diode, where the other end of the switching element is connected to the negative electrode potential. A magnitude of the DC component current applied to the bias coil can be set by changing a duty of a pulse width modulation signal used for switching the switching element.

In this manner, the DC component current applied to the bias coil that applies the bias magnetic field to the magnetostrictive film can be an average current of the inductive current applied from the direct current power supply to the bias coil when the switching element driven by the pulse width modulation signal is turned on and a freewheeling current that flows through the free wheel diode when the switching element is turned off. Consequently, the power consumed by the direct current power supply can be reduced, as compared with a direct current power supply that continuously supply an average electric current.

The disclosure encompasses an electric power steering device using the above-described magnetostrictive torque sensor. According to the disclosure, since the magnetostrictive torque sensor having the bias coil separated from the detection coils is used for the electric power steering device, a decrease in the sensitivity found in existing technology does not occur. In addition, even when, for example, a wheel of a moving vehicle hits a curb and, thus, the excessive torsion torque that significantly exceeds the steering torque to be applied during normal driving is applied, a hysteresis does not occur in the sensor output and, thus, the sensor output does not vary.

In addition, since the detection sensitivity can be increased more than in existing technology, the S/N ratio can be increased and, therefore, the steering feel can be improved. In addition, since the S/N ratio is higher, the range of the malfunction detection threshold value set when, for example, four detection coils are bridge-connected and a voltage appearing at the middle point is determined as the threshold value can be decreased. Accordingly, malfunction can be detected with higher sensitivity.

According to the disclosure, by applying a DC component current to the multi-turn winding bias coil separated from the detection coils, a bias magnetic field is applied to the magnetostrictive film. Thus, even when an excessive torsion torque is applied to the shaft member (in the case of the magnetostrictive torque sensor, and the steering axle in the case of the electric power steering device), a hysteresis does not occur in the sensor output.

In addition, if existing magnetostrictive torque sensors that use the detection coil both as a detection coil and a bias coil increase the number of turns of the detection coil in order to generate a sufficient bias magnetic field and prevent the occurrence of hysteresis, the detection sensitivity decreases due to an increase in a direct current resistive component of the detection coil. However, according to the disclosure, a sufficient bias magnetic field can be applied to the magnetostrictive film without decreasing the detection sensitivity.

Furthermore, according to existing technology, if an electric current applied to the detection coil is increased in order to obtain a sufficient bias magnetic field, the size of a control drive unit, such as an ECU, that supplies an electric current to the detection coil increases or the charge/discharge balancing of the vehicle is lost. However, according to the disclosure, such a disadvantage can be eliminated, and a sufficient bias magnetic field can be applied to the magnetostrictive film.

As described above, according to the present disclosure, a decrease in the detection sensitivity can be minimized. Accordingly, since a sufficient bias magnetic field can be applied without decreasing the S/N ratio, a hysteresis occurring in the sensor output when an excessive torque is applied can be reduced. As a result, a magnetostrictive torque sensor having no variation of the sensor output and having high detection accuracy even when an excessive input torque due to a disturbance is applied can be provided. In addition, an electric power steering device using such a magnetostrictive torque sensor can be also provided.

BRIEF DESCRIPTION OF THE DRAWINGS

The advantages of the disclosure will become apparent in the following description taken in conjunction with the following drawings.

FIG. 6 illustrates an impedance variation vs. the torque before and after the anisotropy is added to the magnetostrictive film.

FIG. 7A is a schematic illustration of the magnetic moment of the sensor shaft when the anisotropy having a predetermined value is added to the magnetostrictive film and the torque is zero; FIG. 7B is a schematic illustration of the magnetic moment of the sensor shaft when the anisotropy having a predetermined value is added to the magnetostrictive film and a torque that is the same as the added anisotropic torque is applied in a direction that removes the anisotropy; FIG. 7C is a schematic illustration of the magnetic moment of the sensor shaft when the anisotropy having a predetermined value is added to the magnetostrictive film and an excessive steering torque is applied in a direction that removes the anisotropy; and FIG. 7D is a schematic illustration of a state in which an anisotropy of a predetermined value is added to the magnetostrictive film, an excessive steering torque is applied in a direction that removes the anisotropy and, thereafter, the torque is removed and, thus, a hysteresis occurs in the magnetic moment of the sensor shaft when the torque is zero.

FIG. 8 is a characteristic diagram indicating that the hysteresis occurs in accordance with an impedance change occurring when an excessive torsion torque is applied after the anisotropy is added to the magnetostrictive film.

FIG. 9A is a schematic illustration of the magnetic moment of the sensor shaft when the anisotropy having a predetermined value is added to the magnetostrictive film and the torque is zero; FIG. 9B is a schematic illustration of the magnetic moment of the sensor shaft when the anisotropy having a predetermined value is added to the magnetostrictive film and an excessive torsion torque is applied in a direction the same as the direction of the anisotropy; and FIG. 9C is a schematic illustration of a state in which the anisotropy having a predetermined value is added to the magnetostrictive film, an excessive steering torque is applied in a direction the same as the direction of the anisotropy and, thereafter, the torque is removed and, thus, a hysteresis does not occur in the magnetic moment of the sensor shaft when the torque is zero.

DETAILED DESCRIPTION

A magnetostrictive torque sensor of an exemplary embodiment of the present disclosure is described in detail below with reference to the accompanying drawings.

Figure 1:
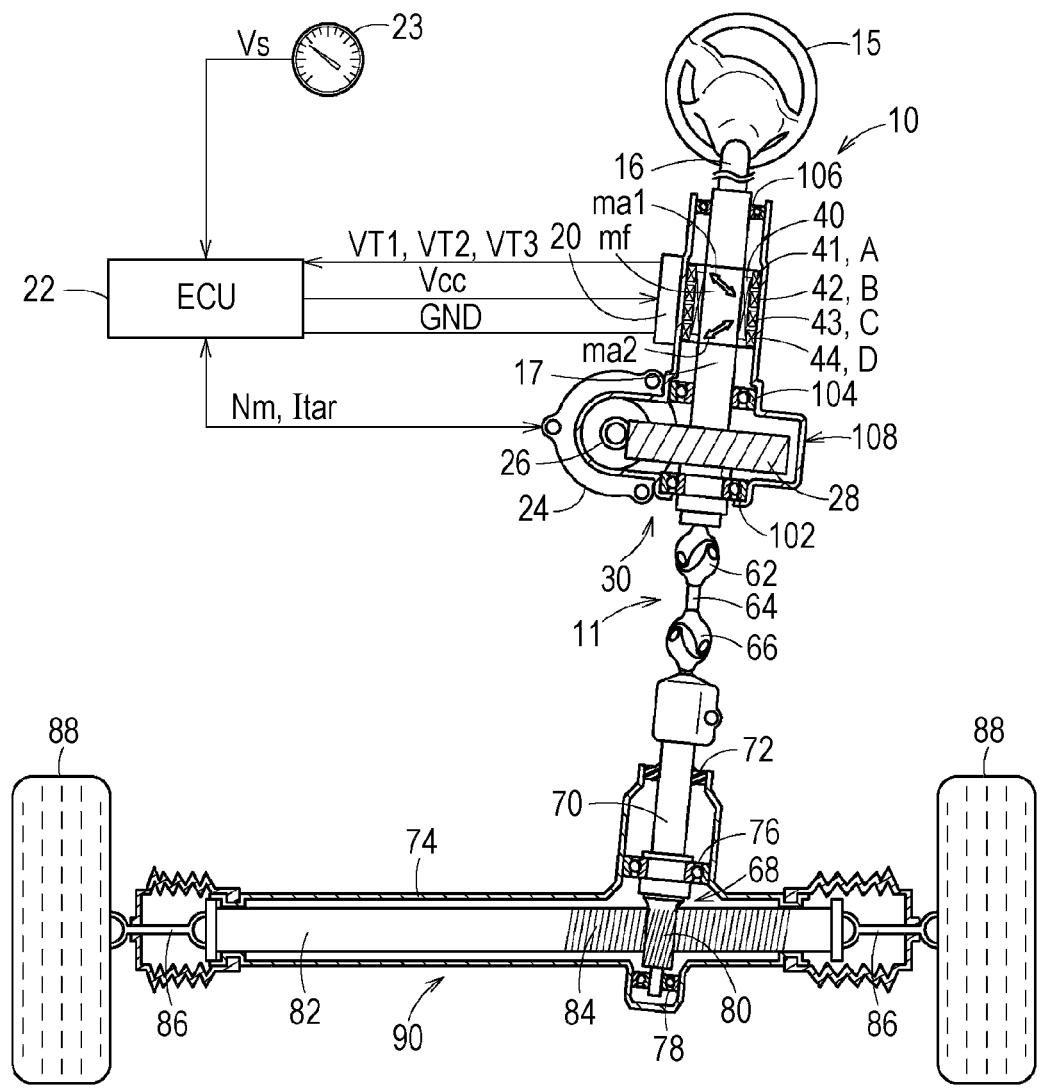
FIG. 1 is a schematic illustration of the configuration of a magnetostrictive torque sensor and an electric power steering device using the magnetostrictive torque sensor according to an exemplary embodiment.

FIG. 1 is a block diagram of an electric power steering device 12 according to the present exemplary embodiment using a magnetostrictive torque sensor 10 according to the present exemplary embodiment. The electric power steering device 12 includes a column shaft drive EPS unit 30.

Figure 24:
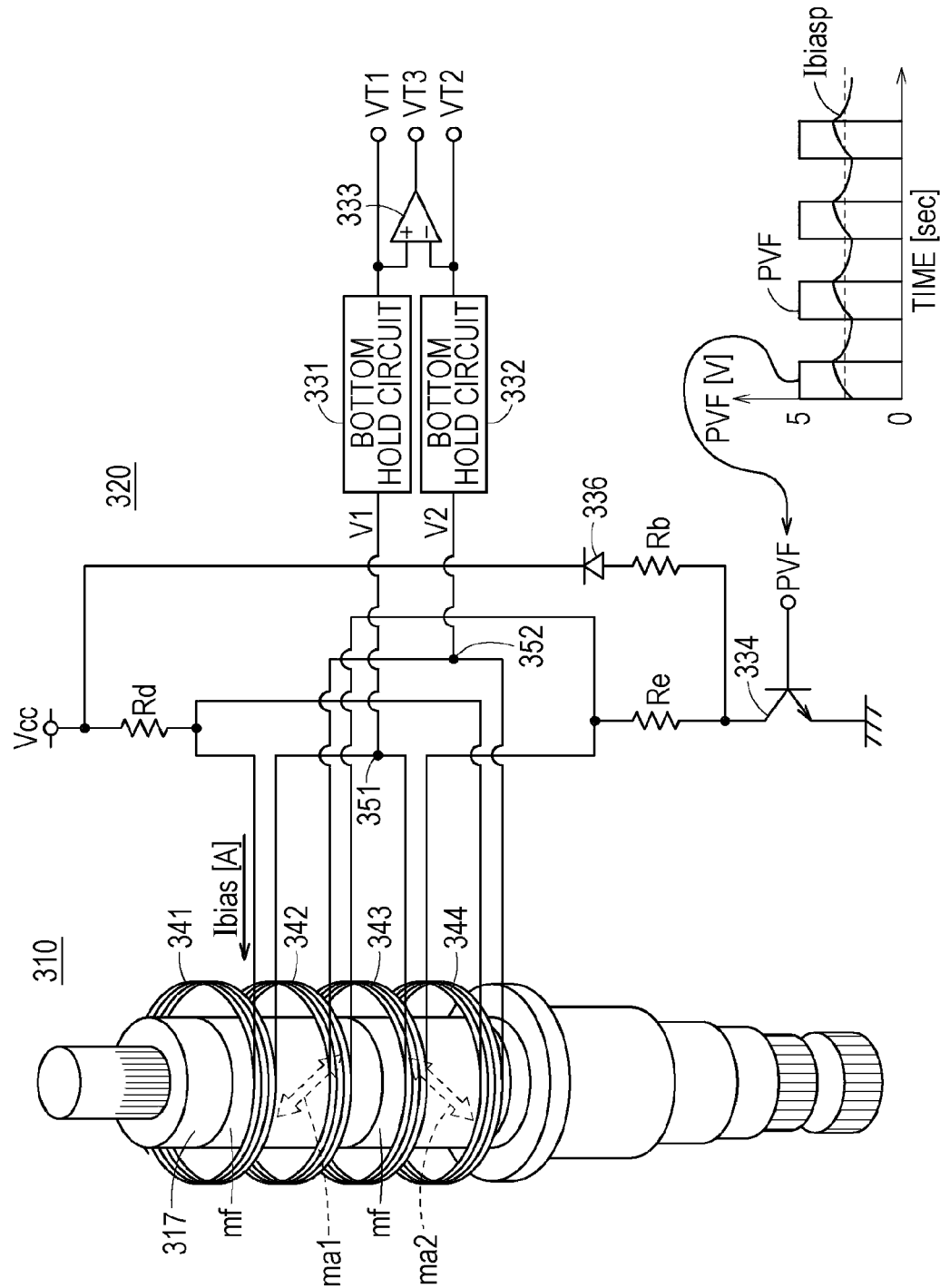
FIG. 24 illustrates a circuit connection between a magnetostrictive torque sensor and a torque detection circuit according to existing technology.
Figure 25:
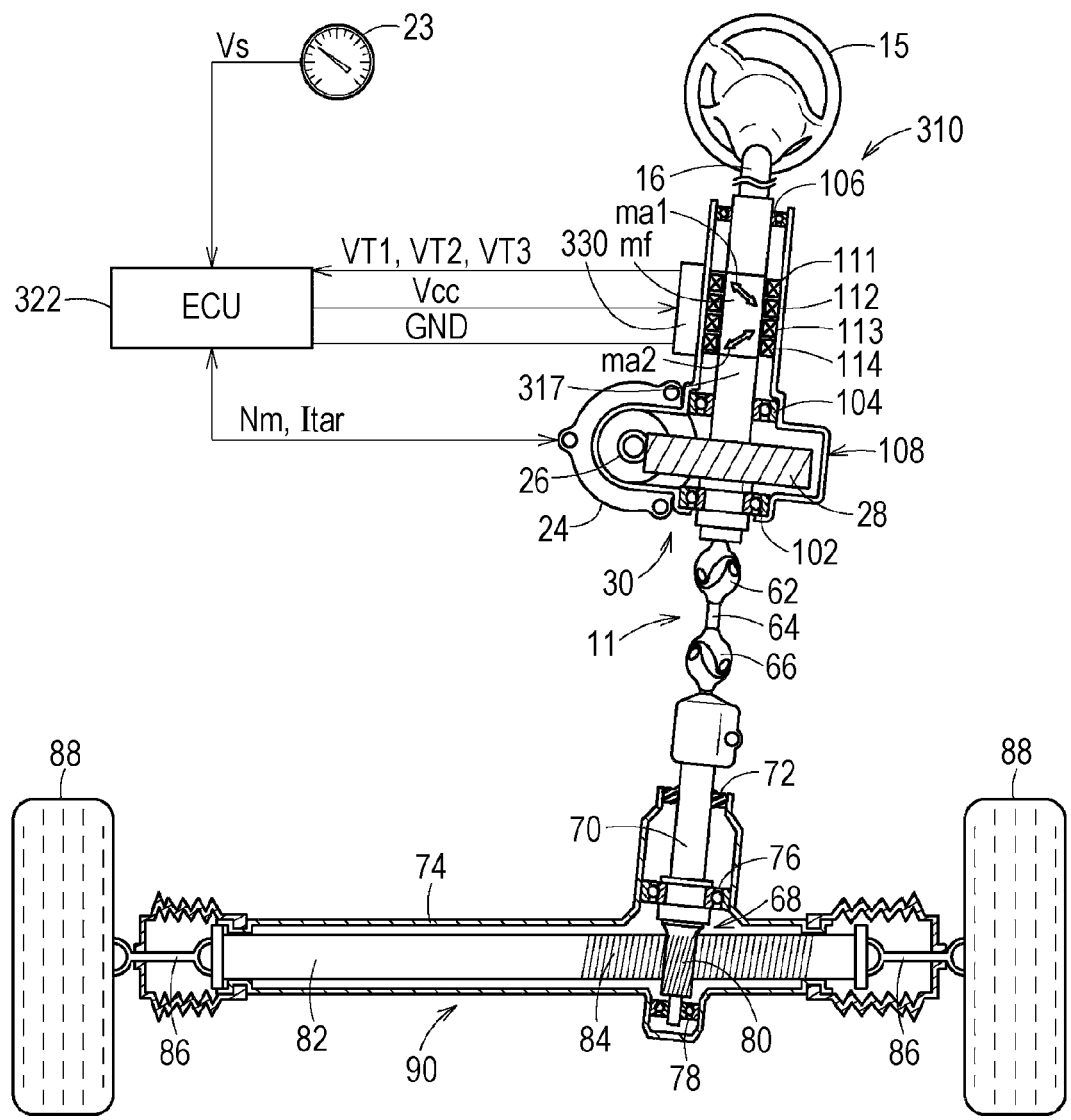
FIG. 25 illustrates an electric power steering device of a comparative example that includes a magnetostrictive torque sensor according to existing technology.

FIG. 25 illustrates a comparative example. That is, FIG. 25 is a block diagram of an electric power steering device 312 using a magnetostrictive torque sensor 310 of a comparative example. The magnetostrictive torque sensor 310 is described in Japanese Patent No. 4581002 illustrated in FIG. 24. Note that in Japanese Patent No. 4581002, a pinion shaft drive EPS is described as an example. In contrast, according to the present exemplary embodiment, a column shaft drive EPS is described as an example. Accordingly, in FIG. 25, the pinion shaft drive EPS described in Japanese Patent No. 4581002 is replaced with a column shaft drive EPS. The present disclosure is applicable to either a column shaft drive EPS or a pinion drive shaft drive EPS.

The same numbering will be used in referring to an element of the electric power steering device 312 according to the comparative example illustrated in FIG. 25 as is utilized above in describing the magnetostrictive torque sensor 310 of Japanese Patent No. 4581002 illustrated in FIG. 24, and detailed description of the element is not repeated. In addition, the same numbering will be used in referring to an element of the electric power steering device 312 according to the comparative example illustrated in FIG. 25 as is utilized in describing the electric power steering device 12 according to the present exemplary embodiment, and detailed description of the element is not repeated.

As illustrated in FIGS. 1 and 25, the electric power steering devices 12 and 312 include a column shaft 16 having a steering wheel 15 fixed thereto at one end and a sensor shaft 17 and the sensor shaft 317 fixed thereto at the other end, respectively. The magnetostrictive torque sensors 10 and 310 are provided on the sensor shafts 17 and 317, respectively. The magnetostrictive torque sensors 10 and 310 detect the steering torque acting on the column shaft 16 which are applied via the steering wheel 15, and the detected steering torque is converted into a steering torque signal VT3 using interface circuits 20 and 330 each including a torque detection circuit, respectively.

Each of electronic control units (ECUs) 22 and 322 calculates a target electric current Itar for causing a motor 24 to generate power on the basis of, for example, the steering torque signal VT3, a vehicle speed signal Vs generated by a vehicle speed sensor 23, and a motor rotation signal Nm of the motor 24.

Each of electronic control units 22 and 322 generates a drive voltage (a pulse width modulation (PWM) signal) for applying the target electric current Itar to the motor 24 and detects an actual motor electric current that is actually applied to the motor 24 using an electric current sensor (not illustrated). Thereafter, each of the electronic control units 22 and 322 performs proportional-integral (PI) control so that the actual motor electric current corresponds to the target electric current Itar. In this manner, each of the electronic control units 22 and 322 causes the motor 24 to generate power. The power generated by the motor 24 is transferred to the column shaft 16 that forms a steering axle 11 via a speed reducer formed from a worm gear 26 fixed to the main shaft of the motor 24 and a worm wheel gear 28 fixed to each of the sensor shafts 17 and 317. Thus, the steering load of the steering wheel 15 imposed on a driver is reduced. Note that according to the present exemplary embodiment, the motor 24 is a brushless motor.

As illustrated in FIGS. 1 and 25, the electric power steering devices 12 and 312 include the column shafts 16 connected to the steering wheel 15 and integrated with the sensor shafts 17 and 317, respectively. The column shaft 16 is connected to a pinion shaft 70 including a rack-and-pinion mechanism 68 via a universal joint 62, an intermediate shaft 64, and a universal joint 66.

The middle and lower portions of the pinion shaft 70 are supported by bearings 76 and 78 accommodated in a gear housing 74 having an oil seal 72 at the top. A pinion gear 80 is provided at the lower end of the pinion shaft 70. The pinion gear 80 is meshed with a rack gear 84 of a rack shaft 82 that can reciprocatingly move in the vehicle width direction. The rack shaft 82 has right and left front wheels 88 serving as steered wheels via tie rods 86 at either end.

Such a configuration allows a widely known rack-and-pinion steering operation through the steering axle 11 (the column shaft 16, the intermediate shaft 64, and the pinion shaft 70) when the steering wheel 15 is operated. Thus, by turning the front wheels 88, the vehicle direction can be changed. Note that the rack shaft 82, the rack gear 84, and the tie rods 86 form a steering mechanism 90. The steering mechanism 90, the steering axle 11, and the steering wheel 15 form a steering system.

The lower, middle, and upper portions of the column shaft 16 are supported by bearings 102, 104, and 106, respectively. The bearings 102, 104, and 106 are accommodated in a column shaft housing 108.

As described above, each of the electric power steering devices 12 and 312 includes the motor 24 that supplies the auxiliary steering force to the column shaft 16 in order to reduce a steering force by the steering wheel 15. The worm gear 26 provided on the main shaft of the motor 24 meshes with a worm wheel gear 28 provided between the bearing 102 and the bearing 104 of the column shaft 16 (a sensor-shaft-17 integrated column shaft). The worm gear 26 and the worm wheel gear 28 form the speed reducer. The speed reducer converts the rotation and drive force of the motor 24 into the rotation and drive force of the column shaft 16 that is smooth and is double the rotation and drive force of the motor 24.

In such a case, each of the magnetostrictive torque sensors 10 and 310 is disposed between the bearing 104 located in the middle portion of the column shaft 16 and the bearing 106 located in the upper portion of the column shaft 16. Each of the magnetostrictive torque sensors 10 and 310 detects the steering torque, which is the torque of the column shaft 16

(the steering axle 11), on the basis of a variation of the magnetic property caused by magnetostriction.

Figure 2:
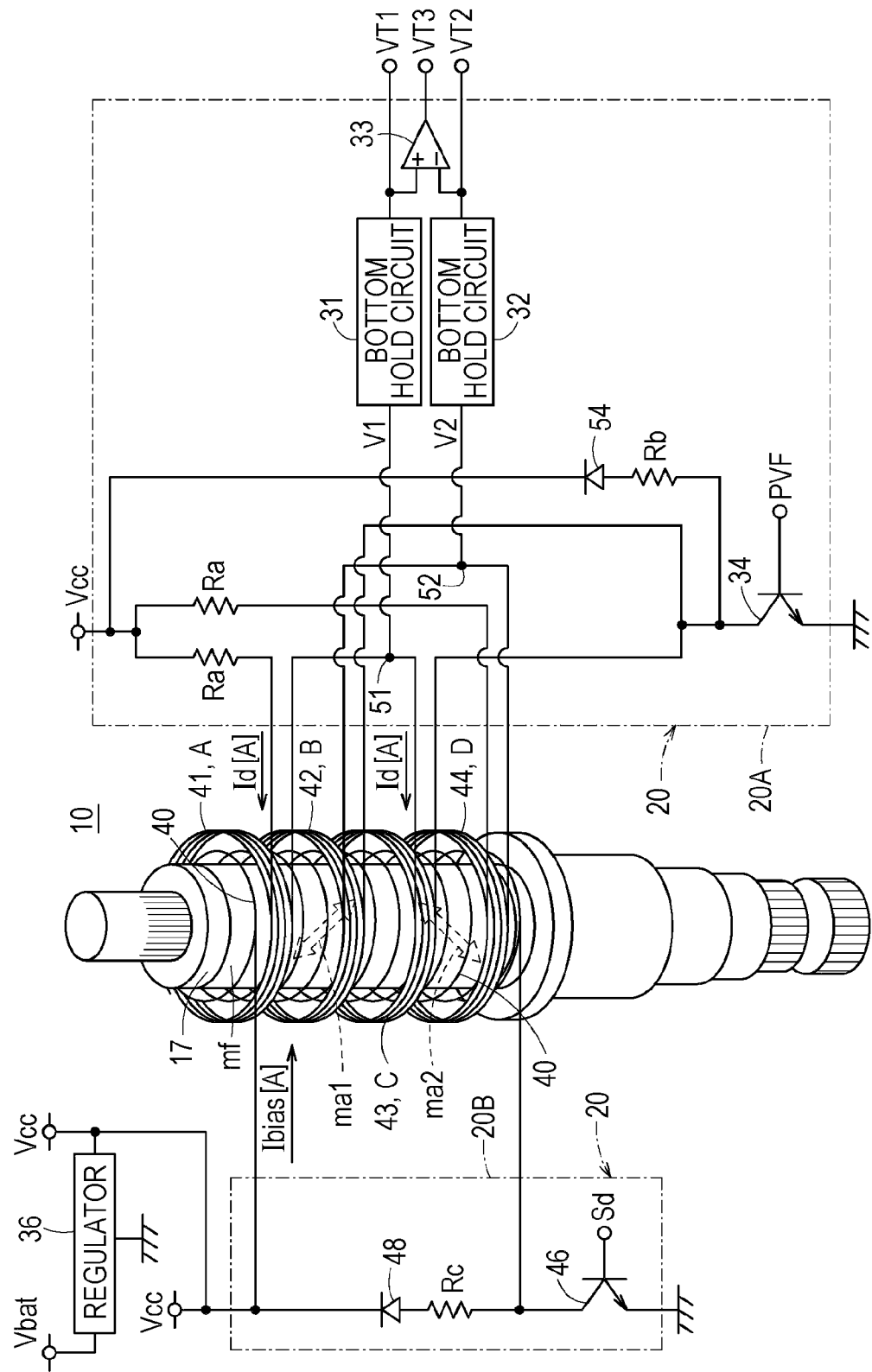
FIG. 2 illustrates a circuit connection relationship among the magnetostrictive torque sensor, a bias current generation circuit, and a torque detection circuit according to the exemplary embodiment.

FIG. 2 illustrates a connection relationship among a bias coil 40, a detection coil 41 (for ease of understanding, also referred to as a "detection coil A"), a detection coil 42 (also referred to as a "detection coil B"), a detection coil 43 (also referred to as a "detection coil C"), and a detection coil 44 (also referred to as a "detection coil D") of the magnetostrictive torque sensor 10, and the interface circuit 20 according to the present exemplary embodiment. The interface circuit 20 includes a torque detection circuit 20A and a bias current generation circuit (a direct component current supply circuit) 20B. As illustrated in FIG. 2, a voltage Vbat (12 [V]) output from a battery (not illustrated) is reduced to a direct current voltage source (a direct current power supply) Vcc having a constant voltage of 5 [V] via a regulator 36.

As illustrated in FIGS. 1 and 2, according to the present exemplary embodiment, the electric power steering device 12 includes the sensor shaft 17 having a magnetostrictive film mf thereon. The magnetostrictive film mf is formed by plating a Ni65[%]-Fe35[%] magnetostrictive film on the sensor shaft 17 and adding anisotropy ma1 and anisotropy ma2 thereto. The bias coil 40 is formed so as to surround the magnetostrictive film mf. The bias current generation circuit 20B applies a bias current Ibias (a DC component current) to the bias coil 40 and, thus, a bias magnetic field Hbias of the direct current component is applied to the magnetostrictive film mf.

A portion of the magnetostrictive film mf having the anisotropy ma1 added thereto is wound around by the detection coil 41 (A) and the detection coil 42 (B). In contrast, a portion of the magnetostrictive film mf having the anisotropy ma2 added thereto is wound around by the detection coil 43 (C) and the detection coil 44 (D).

The detection coil A and the detection coil C are connected in series. The detection coil A is connected to the direct current voltage supply Vcc (the voltage is also referred to as "Vcc") via a damping resistor Ra (the resistance value is also referred to as "Ra"). The detection coil C is connected to a switching element 34. By driving the switching element 34 using a square wave signal PVF, a detection current Id [A], which is an alternating current, is applied to the detection coils A and C.

By applying the steering torque from the steering wheel 15 to the sensor shaft 17 via the column shaft 16, the magnetic permeability of the portions of the magnetostrictive film mf having the anisotropy ma1 and the anisotropy ma2 added thereto can vary and, thus, the inductance of each of the detection coils A and C varies. For example, the inductance of the detection coil A increases, whereas the inductance of the detection coil C decreases. At that time, the same detection current Id, which is an alternating current, flows through the detection coil A and the detection coil C. Accordingly, a divided voltage V1 generated by a voltage caused by the product of the inductance of the detection coil A and an electric current variation and a voltage caused by the product of the inductance of the detection coil C and the electric current variation appears at a middle point 51 between the detection coils A and C (the divided voltage V1 is also referred to as a "middle point voltage V1").

The middle point voltage V1 at the middle point between the detection coils A and C is held by a bottom hold circuit 31 and is amplified. In this manner, an output voltage VT1 can be obtained.

Similarly, the detection coil D and the detection coil B are connected in series. The detection coil D is connected to the direct current voltage supply Vcc via the damping resistor Ra, and the detection coil B is connected to a collector terminal of the switching element 34. The detection current Id, which is an alternating current, is applied to the detection coils B and D by driving a base terminal of the switching element 34 having an emitter terminal connected to ground using the square wave signal PVF. In such a case, by applying the steering torque from the steering wheel 15 to the sensor shaft 17 via the column shaft 16, the magnetic permeability of the portions of the magnetostrictive film mf having the anisotropy ma1 and the anisotropy ma2 added thereto vary and, thus, the inductance of each of the detection coils B and D varies. For example, the inductance of the detection coil B increases, whereas the inductance of the detection coil D decreases. At that time, the same alternating current flows through the detection coils B and D. Accordingly, a divided voltage (a middle point voltage) V2 generated by a voltage caused by the product of the inductance of the detection coil D and an electric current variation and a voltage caused by the product of the inductance of the detection coil B and the electric current variation appears at a middle point 52 between the detection coils B and D. The middle point voltage V2 of the middle point between the detection coils B and D is held by a bottom hold circuit 32 and is amplified. In this manner, an output voltage VT2 can be obtained.

In addition, an output voltage of the differential amplifier 33, which is a differential output generated from the output voltage VT1 and the output voltage VT2, is obtained as a steering torque signal VT3. Thereafter, the electronic control unit 22 calculates the target electric current Itar on the basis of the steering torque signal VT3 in the same manner as described above. Furthermore, the electronic control unit 22 performs malfunction detection using the output voltage VT1 and the output voltage VT2. More specifically, if the sum voltage of the output voltage VT1 and the output voltage VT2 is outside a predetermined threshold value range, it is determined that malfunction occurs.

Figure 3:
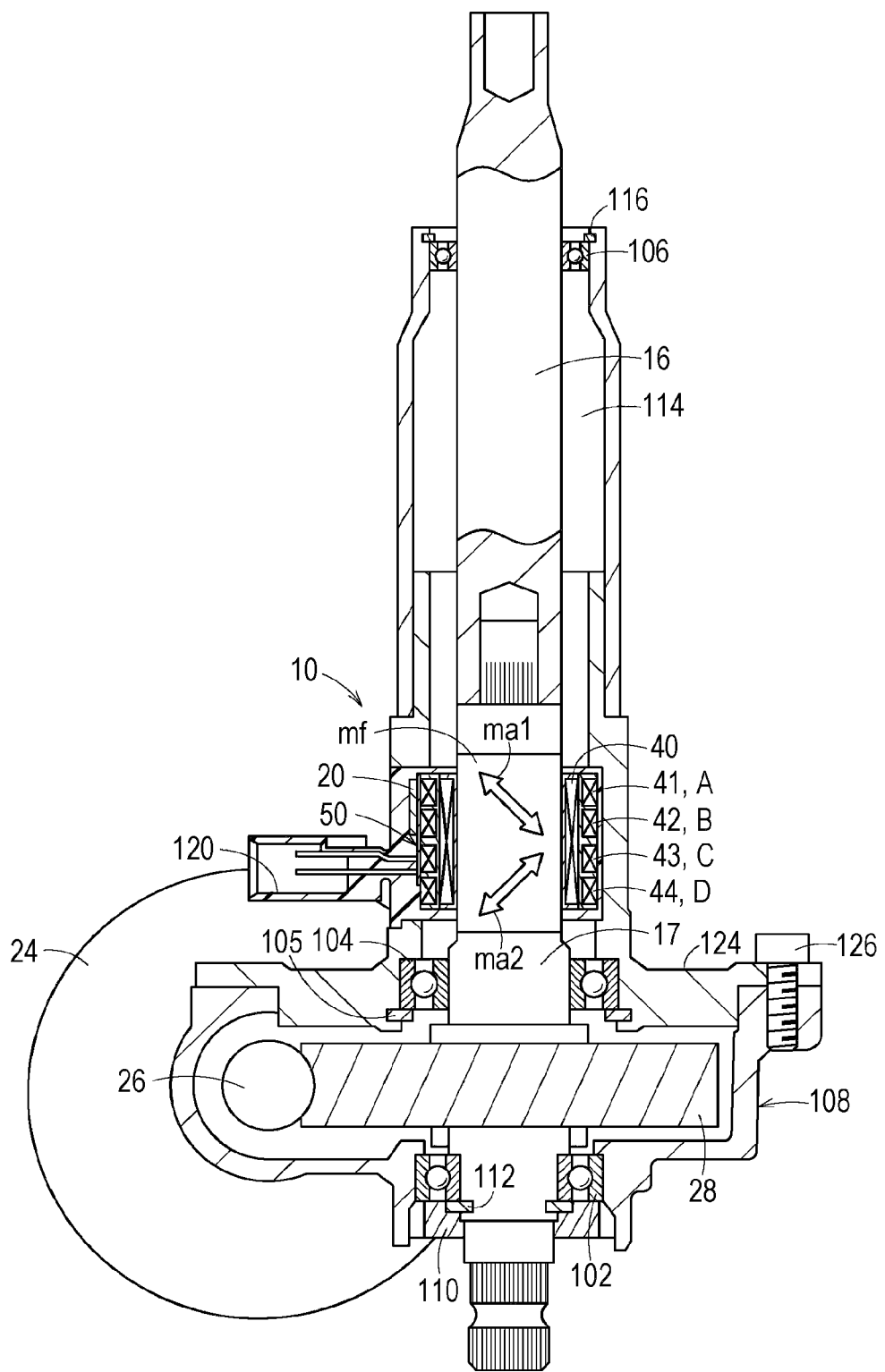
FIG. 3 illustrates the configuration of a column shaft drive EPS unit including the magnetostrictive torque sensor according to the exemplary embodiment.
Figure 4:
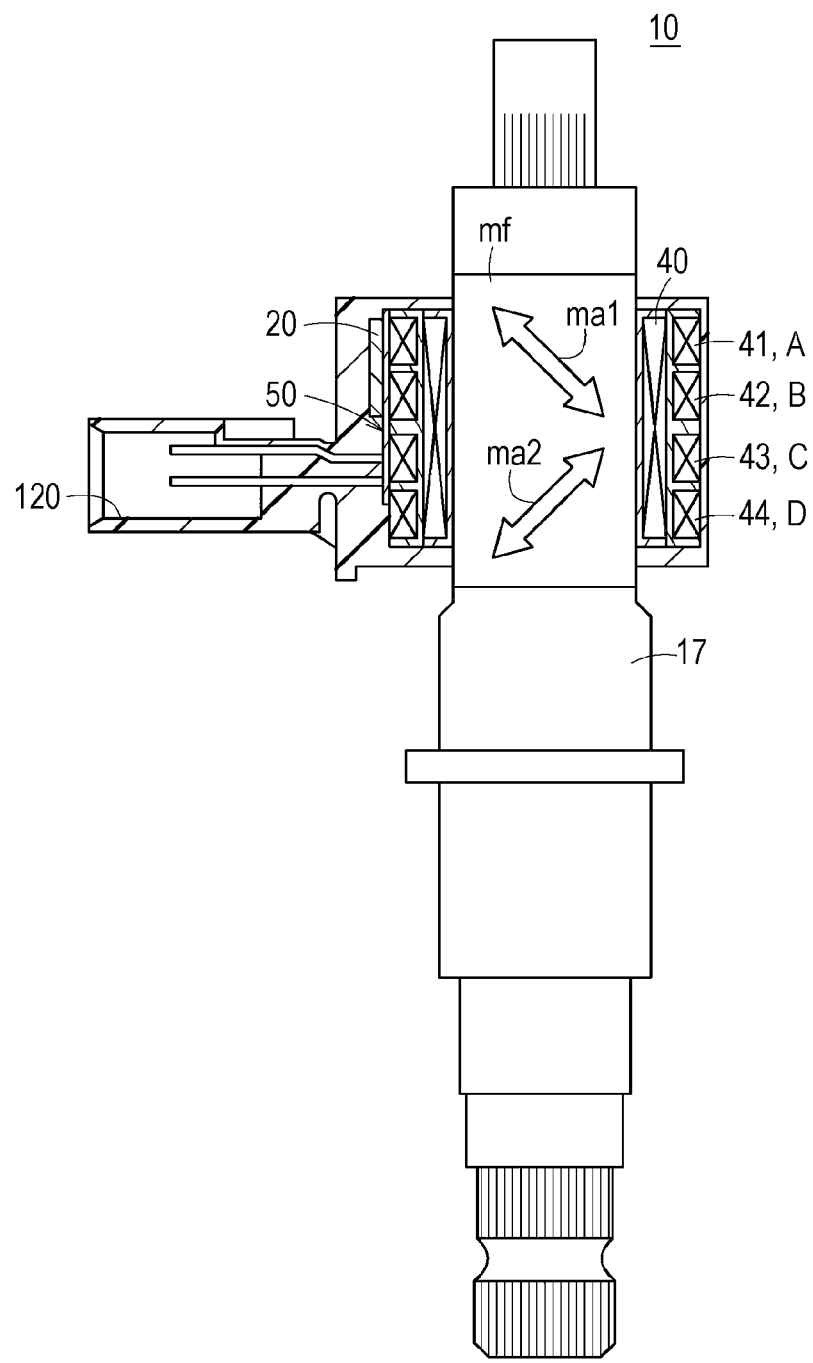
FIG. 4 illustrates the configuration of the magnetostrictive torque sensor according to the exemplary embodiment in detail.

FIG. 3 illustrates the configuration of the column shaft drive EPS unit 30 illustrated in FIG. 1 in detail. FIG. 4 illustrates the configuration of the magnetostrictive torque sensor 10 illustrated in FIGS. 1 and 3 in detail.

The magnetostrictive torque sensor 10 is formed by plating an Ni65[%]-Fe35[%] film having a thickness of about 30 to about 40 [1 m] on the sensor shaft 17, which is a shaft member formed by heat-processing a steel, such as S45C or SCM420 first. Thus, the magnetostrictive film mf is provided on the sensor shaft 17. Thereafter, a rotational torque is applied about the axis of rotation of the sensor shaft 17, and the magnetostrictive film mf is heated by a radio-frequency heating. After magnetostrictive film mf is cooled, the rotational torque is removed so that the anisotropy (magnetic anisotropy) ma1 and the anisotropy mat are added. At that time, the anisotropy ma1 and the anisotropy ma2 are added to vertically different portions so that the directions thereof differ from each other.

The worm wheel gear 28 is press-fitted to the sensor shaft 17 and is fixed to the sensor shaft 17. Thereafter, the column shaft 16 is press-fitted to the sensor shaft 17 having the magnetostrictive film mf and the worm wheel gear 28 provided thereon. In addition, after the bearing 102 is lightly press-fitted to the column shaft housing 108, the bearing 102 is fixed to the column shaft housing 108 using a fixing screw 110. One end of the sensor shaft 17 passes through the inner ring of the bearing 102 and is fixed using a retaining ring 112. In this manner, an assembly of the column shaft 16 and the sensor shaft 17 is rotatably fixed to the column shaft housing 108.

In addition, a column pipe 114 is press-fitted to a housing 124 and is fixed to the housing 124. Thereafter, the bearing 106 is lightly press-fitted to the opening of the column pipe 114 and is fixed to the column pipe 114 using a retaining ring 116.

Subsequently, a coil assembly 50 having a connector 120 formed by integrally resin-molding, the bias coil 40, the detection coils 41 to 44 (A to D), and the interface circuit 20 is inserted through an opening formed on the side surface of the housing 124 and is fixed using a fixing screw (not illustrated). Thereafter, the column shaft housing 108 having the assembly of the column shaft 16 and the sensor shaft 17 rotatably fixed thereto is fixed to the housing 124 by a bolt 126. At that time, the housing 124 has the bearing 104 lightly press-fitted and fixed thereto using a retaining ring 105 and the coil assembly 50 attached thereto.

Furthermore, the worm gear 26 is rotatably fixed to the housing 124 using a fixing screw (not illustrated) so that the worm gear 26 smoothly meshes with the worm wheel gear 28. Thereafter, the motor 24 is fixed to the housing 124 using a screw so that the torque is transferred to the worm gear 26 via a serration provided on the main shaft of the motor 24.

Note that the end of the column shaft 16 adjacent to the bearing 106 of the column shaft drive EPS unit 30 is fixed to the steering wheel 15, and a serration portion adjacent to the bearing 102 is fitted to the universal joint 62.

In this manner, the column shaft drive EPS unit 30 including the magnetostrictive torque sensor 10 according to the present exemplary embodiment is attached to a vehicle body, as illustrated in FIG. 1 and constitutes the electric power steering device 12.

In the magnetostrictive torque sensor 10 according to the present exemplary embodiment, the bias magnetic field Hbias can be applied to the magnetostrictive film mf by applying the bias current Ibias, which is a DC component current, through the bias coil 40 separated from the detection coils 41 to 44. Accordingly, as described in more detail below, a sufficient bias magnetic field Hbias can be applied to the magnetostrictive film mf without decreasing the detection sensitivity of the magnetostrictive torque sensor 10. Thus, a hysteresis voltage Vhs generated in the steering torque signal VT3 during application of the excessive torque Tex can be reduced without decreasing the S/N ratio. Accordingly, the magnetostrictive torque sensor 10 having no output variation and high detection accuracy even when the excessive torque Tex caused by a disturbance is applied can be produced.

In this manner, when, for example, the wheel of a moving automobile hits a curb and if the excessive torsion torque Tex that significantly exceeds the steering torque generated during normal driving (excessive torque Tex) is applied to the steering axle 11, the hysteresis voltage Vhs is not generated in the middle point voltages V1 and V2 output from the sensors. That is, a variation of the output does not occur. In addition, since the noise is low, the S/N ratio increases. Consequently, the steering feel is improved. Furthermore, since the S/N ratio is higher, the malfunction detection threshold value can be set to a smaller value and, thus, malfunction can be detected with higher sensitivity.

In column shaft drive EPSs having the magnetostrictive torque sensor 10 in the vicinity of the steering wheel 15, an electric current that flows when a horn is blown by a driver directly passes through the sensor shaft 17 via the column shaft 16. In contrast, in the magnetostrictive torque sensor 10 according to the present exemplary embodiment, a negative impact caused by such an electric current can be eliminated, since a sufficient bias magnetic field Hbias is applied.

Reduction in Hysteresis

The reason for the increase in the hysteresis voltage Vhs when the excessive torque Tex is applied and the decrease when the bias magnetic field Hbias is applied is described below.

Figure 5A:
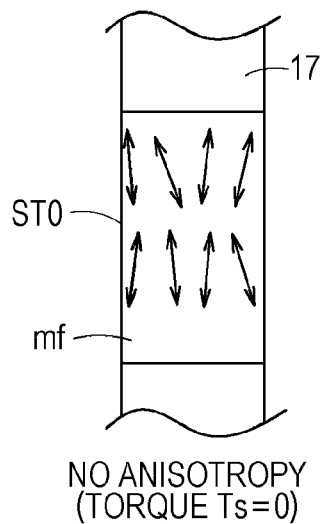
FIG. 5A is a schematic illustration of a magnetic moment of a sensor shaft when a torque applied to the sensor shaft is zero.
Figure 5B:
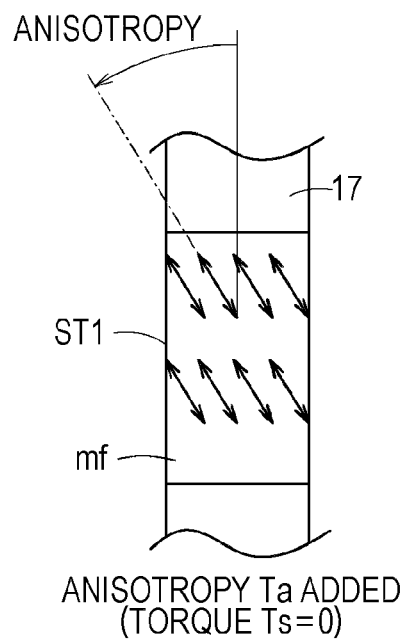
FIG. 5B is a schematic illustration of the magnetic moment of the sensor shaft when the torque applied is zero after an anisotropy of a predetermined value is added to a magnetostrictive film.

FIG. 5A is a schematic illustration of a state ST0 of a magnetic moment (indicated by a double-headed arrow) before the anisotropy ma is added to the magnetostrictive film mf when a steering torque Ts applied to the sensor-shaft-17 integrated column shaft 16 is zero (Ts=0). FIG. 5B is a schematic illustration of a state ST1 of the magnetic moment after the anisotropy ma is added to the magnetostrictive film mf when the steering torque Ts=0. FIG. 6 illustrates the impedance characteristic [Ω] 301 of the magnetostrictive film mf vs. the steering torque Ts before the anisotropy ma is added to the magnetostrictive film mf and the impedance characteristic [Ω] 302 of the magnetostrictive film mf vs. the steering torque Ts after the anisotropy ma is added to the magnetostrictive film mf.

In reality, in FIG. 5B, another anisotropy ma is added to the magnetostrictive film mf at another location in the axis direction. However, for simplicity, description of such another anisotropy ma is not provided here. The following description is made with reference to the impedance characteristic 302 obtained when one of the anisotropies ma is added.

As illustrated in FIG. 6, in the case where the anisotropy ma is not added, the impedance characteristic [Ω] 301 with respect to the steering torque Ts reduces from its value obtained when the torque is zero (Ts=0) even when the steering torque Ts [Nm] is applied in either the right direction or left direction. The magnetic moments are not aligned when the torque is zero (Ts=0), as illustrated in FIG. 5A, and the directions of the magnetic moments easily change. At that time, if the directions of the magnetic moments change due to the steering torque Ts, the impedance changes.

In contrast, as illustrated in FIG. 5B and FIG. 6, if anisotropy Ta of a torque (torsion torque) Ta (60 [Nm]) of a predetermined value equivalent to a torsion torque is added (note that the torque Ta is also referred to as an "anisotropic torque Ta"), the impedance increases or decreases in accordance with the direction of the steering torque Ts (to the right (the right direction) or to the left (the left direction)), as indicated by the impedance characteristic 302. For example, in FIG. 6, if the steering torque Ts is applied in the right direction, the impedance increases. In contrast, if the steering torque Ts is applied in the left direction, the impedance decreases. By performing radio-heating with the torsion torque Ta being applied and, after a cooling operation, removing the torsion torque Ta, the magnetostrictive film mf can be subjected to creep and, thus, the anisotropic torque Ta can be added. In this manner, as illustrated in FIG. 5B, the anisotropy (the above-described anisotropy ma) can be provided to the magnetic moments. At that time, if the steering torque Ts is applied in the right or left direction, the inclination of the magnetic moment increases or decreases and, thus, the impedance increases or decreases. In a normal use range of an input torque (±10 [Nm]), a hysteresis Hs (a hysteresis impedance Zhs) negligibly appears in the impedance characteristic 302.

The following case is discussed below: the case in which an excessive torque Tex (about 250 [Nm]) that significantly exceeds a normal driving steering torque Ts=±10 [Nm] (e.g., a torque generated when a wheel of the moving automobile hits a curb) is applied to the steering axle 11 (the sensor-shaft-17 integrated column shaft 16).

FIG. 7A illustrates the state ST1 in which the anisotropic torque Ta (=60 [Nm]) is added and the steering torque Ts=0. FIG. 7B illustrates the state ST2 in which the steering torque Ts that is the same as the added anisotropic torque Ta (Ts=Ta) is applied when the magnetic moments are in the state ST1. FIG. 7C illustrates a state ST3 of the magnetic moments occurring when an excessive steering torque Ts (=the excessive torque Tex=250 [Nm]) that is greater than the added anisotropic torque Ta is input in a direction that decreases the anisotropy illustrated in FIG. 7A.

Subsequently, if the excessive steering torque Ts (=the excessive torque Tex=250 [Nm]) is removed in the state ST3 illustrated in FIG. 7C, the hysteresis Hs appears in the state of the magnetic moments since the direction of the magnetic moments changed from a right-down and left-up direction (FIG. 7A) to a right-up and left-down direction (FIG. 7C) once, although the added anisotropy ma does not disappear due to creep. As a result, as can be seen from a state ST4 illustrated in FIG. 7D and an impedance characteristic 304 indicated by an alternate long and short dash line in FIG. 8, the hysteresis impedance Zhs is generated in the original impedance characteristic 302.

Figure 10:
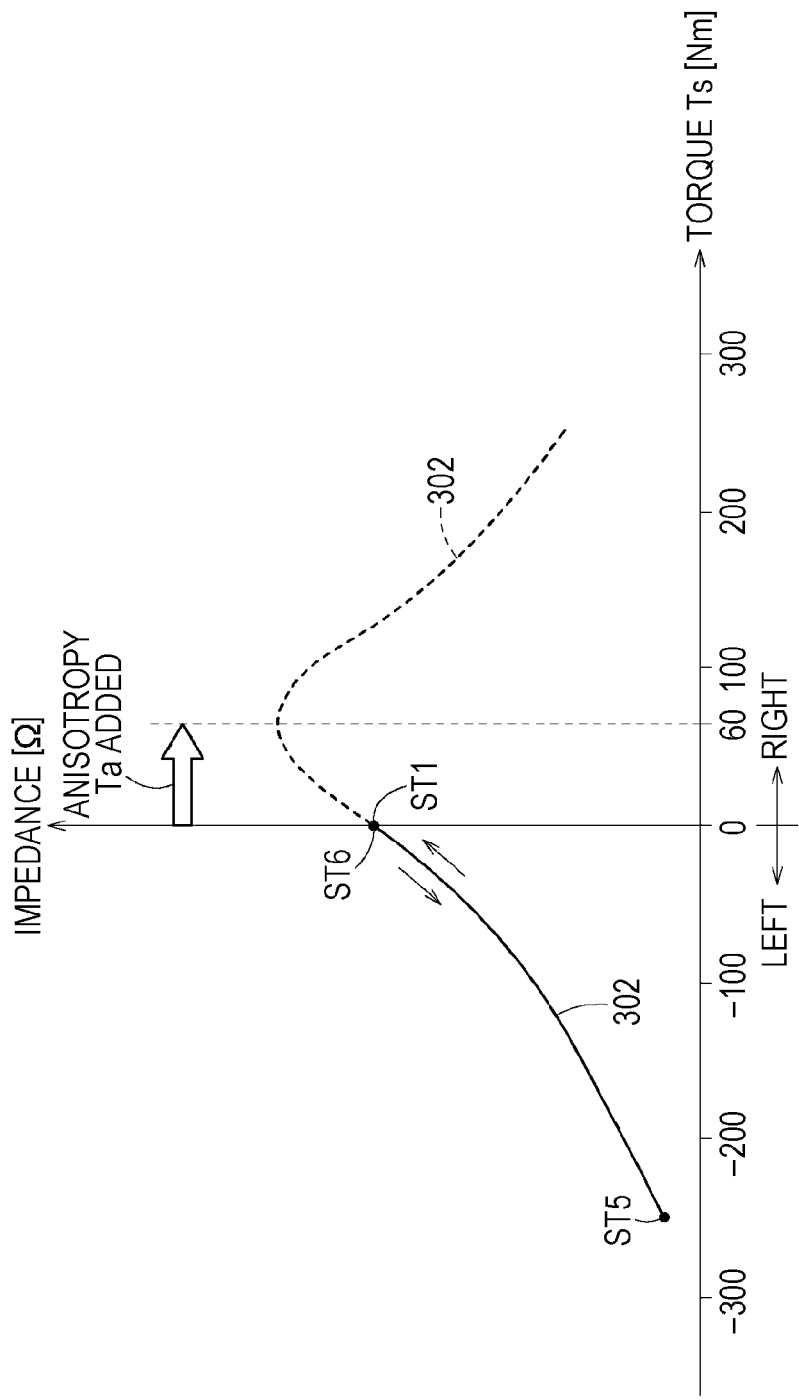
FIG. 10 is a characteristic diagram indicating that no hysteresis occurs in accordance with an impedance change occurring when a torque is applied after the anisotropy is added to the magnetostrictive film.

In contrast, even when as illustrated in FIGS. 9A, 9B, and 9C, the excessive torsion torque Tex (250 [Nm]) that significantly exceeds the steering torque Ts during normal driving is applied to the steering axle 11 (i.e., the state changes from ST1 to ST6 via ST5), the hysteresis impedance Zhs is not generated if as illustrated in FIG. 10, the excessive steering torque Ts (=−250 [Nm]) is applied in a direction that is the same as the direction of the added anisotropy ma. This is because unlike the case illustrated in FIGS. 7A to 7D, the direction of the magnetic moments does not change.

Accordingly, if, as indicated by an outlined arrow in FIGS. 11A, 11B, 11C, and 11D, the bias magnetic field Hbias of a direct current that makes a magnetic flux Φ passing through the magnetostrictive film mf higher than or equal to a saturated magnetic flux density Bs is applied in the axis direction of the sensor shaft 17, a hysteresis component of the magnetic moment is fixed to one side of the hysteresis due to the bias magnetic field Hbias and, thus, is stationary. In this manner, as illustrated in FIG. 12, even after an excessive torque Tex of ±250 [Nm] is applied, the hysteresis is not generated in the torque in the normal use range and the impedance characteristic 302 (Hs=0 in FIG. 11D).

Figure 11:
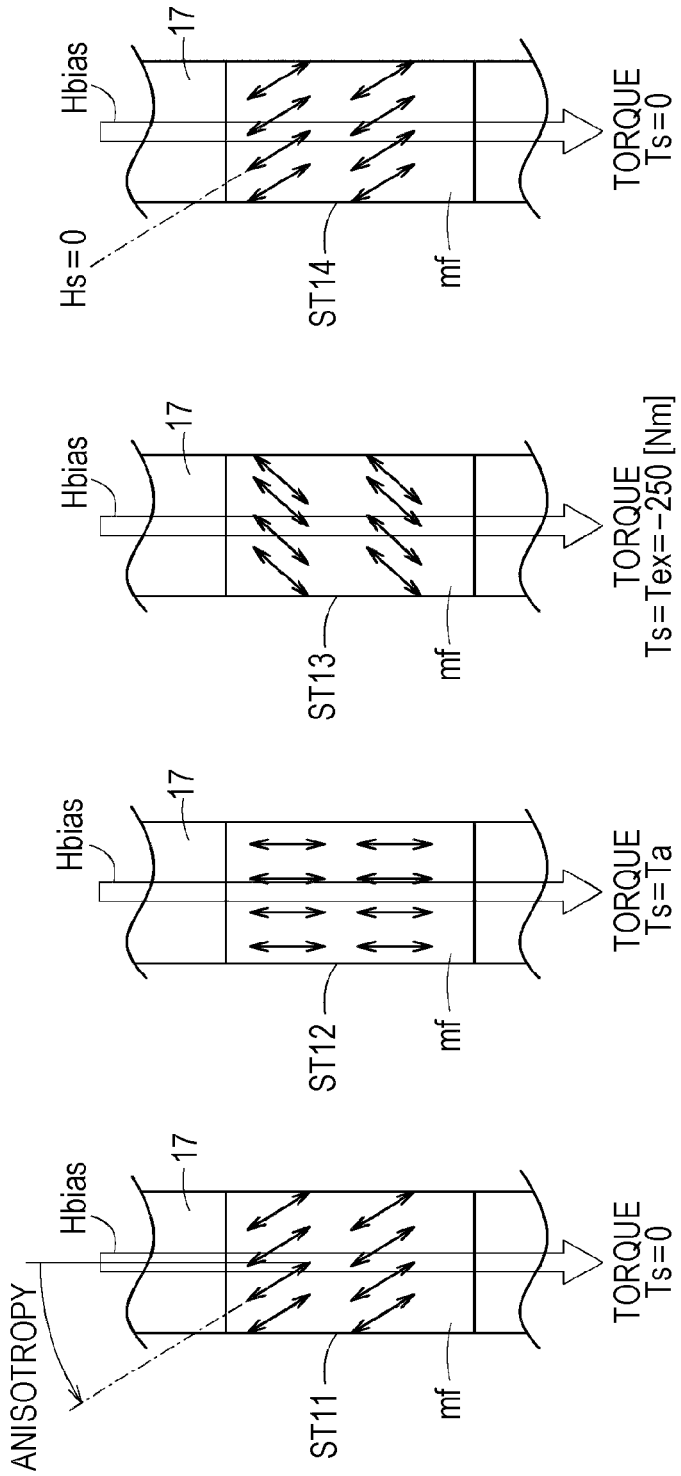
FIG. 11A is a schematic illustration of the magnetic moment of the sensor shaft when an anisotropy of a predetermined value and a bias magnetic field are added to the magnetostrictive film and the torque is zero.
FIG. 11B is a schematic illustration of the magnetic moment of the sensor shaft when an anisotropy of a predetermined value and a bias magnetic field are added to the magnetostrictive film and if a torque that is the same as the added anisotropic torque is applied in a direction that removes the anisotropy.
FIG. 11C is a schematic illustration of the magnetic moment of the sensor shaft when an anisotropy of a predetermined value and a bias magnetic field are added to the magnetostrictive film and if an excessive torsion torque is applied in a direction that removes the anisotropy.
FIG. 11D is a schematic illustration of a state in which an anisotropy of a predetermined value is added to the magnetostrictive film, an excessive torsion torque is applied in a direction that removes the anisotropy and, thereafter, the torque is removed and, thus, no hysteresis occurs in the magnetic moment of the sensor shaft when the torque is zero.
Figure 12:
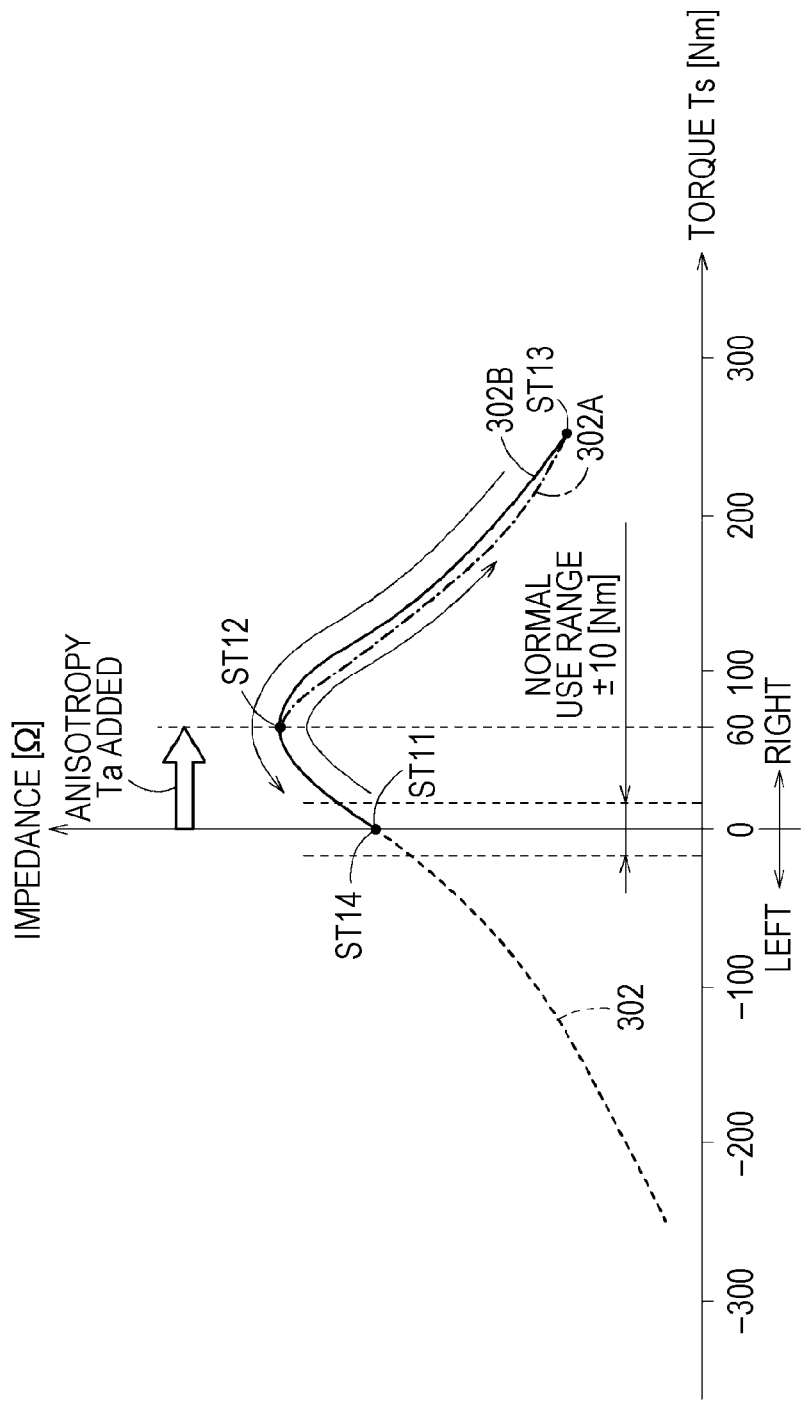
FIG. 12 is a characteristic diagram indicating that no hysteresis occurs in accordance with an impedance change occurring when an excessive torsion torque is applied after the anisotropy is added to the magnetostrictive film.

FIG. 11A is a schematic illustration of the magnetic moment of the sensor shaft 17 in a state ST11 in which the anisotropy Ta (the anisotropic torque Ta) of a predetermined value and the bias magnetic field Hbias are added to the magnetostrictive film mf and the steering torque Ts is zero. FIG. 11B is a schematic illustration of the magnetic moment of the sensor shaft 17 in a state ST12 in which the anisotropy Ta (the anisotropic torque Ta) having a predetermined value and the bias magnetic field Hbias are added to the magnetostrictive film mf and the steering torque Ts is applied in such a direction that the anisotropy having the predetermined value disappears. FIG. 11C is a schematic illustration of the magnetic moment of the sensor shaft 17 in a state ST13 in which the anisotropy Ta (the anisotropic torque Ta) having a predetermined value and the bias magnetic field Hbias are added to the magnetostrictive film mf and the excessive torsion torque Tex is applied in such a direction that the anisotropy disappears (refer to a characteristic 302A in FIG. 12). FIG. 11D is a schematic illustration of a state in which after the anisotropy Ta (the anisotropic torque Ta) having a predetermined value is added to the magnetostrictive film mf and the excessive torsion torque Tex is applied in such a direction that the anisotropy disappears, the excessive torsion torque Tex is removed and, thus, the hysteresis Hs is not generated in the magnetic moment of the sensor shaft 17 when the steering torque Ts is zero (refer to a characteristic 302B in FIG. 12).

Figure 13:
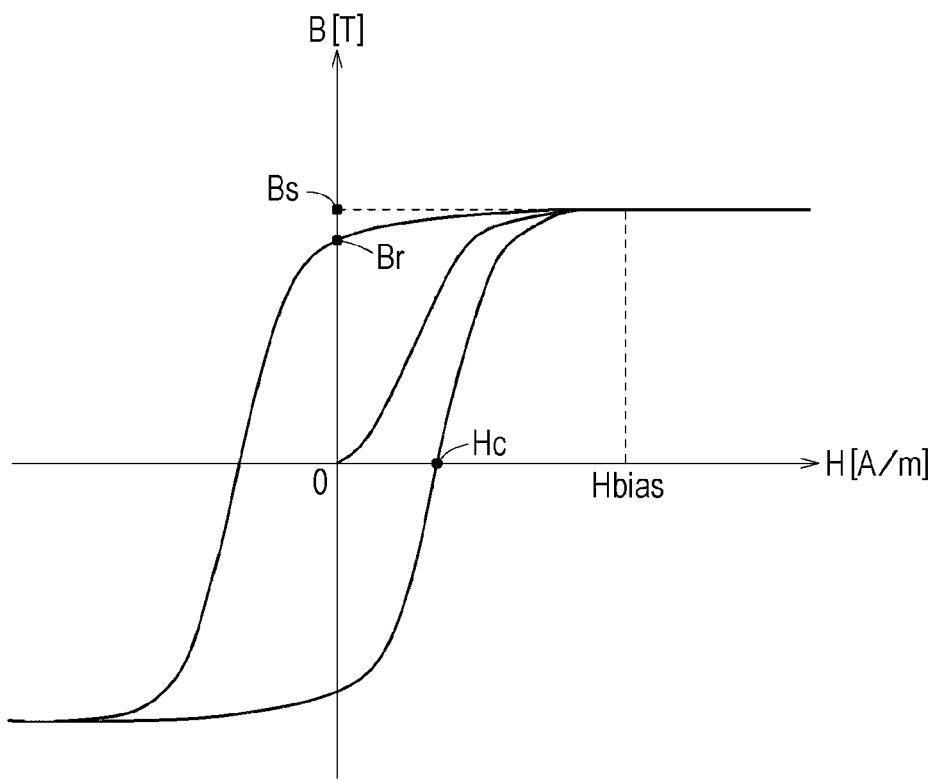
FIG. 13 illustrates the bias magnetic field in B-H curve.

In this case, as indicated by a B-H curved line in FIG. 13, the bias magnetic field Hbias that is greater than or equal to a saturated magnetic flux density Bs of the magnetostrictive film mf, which is sufficient to saturate the magnetic flux density of the magnetostrictive film mf, should be applied. Note that in FIG. 13, a remanent magnetic flux density Br and a retaining force Hc are illustrated.

The operations of the bias coil 40 and the detection coils A to D and the hysteresis (the hysteresis voltage) when an input torque of the steering torque signal VT3 is zero after the bias magnetic field Hbias and an excessive torsion torque Tex of ±250 [Nm] are applied are described below.

As illustrated in FIG. 2, the bias coil 40 is wound around the magnetostrictive film mf provided on the sensor shaft 17 throughout the length of the magnetostrictive film mf. In reality, a coil wound around a bobbin made of resin is disposed. The bias current Ibias, which is a DC component current, is applied from the bias current generation circuit 20B disposed in the interface circuit 20 to the bias coil 40 and, thus, the bias magnetic field Hbias is generated.

To apply the bias current Ibias, the circuit connection of the bias current generation circuit 20B using a switching element 46 and a free wheel diode 48, as illustrated in FIG. 2, may be employed so that a freewheeling current Ifly (a DC component) flows through the bias coil 40 using the inductance component of the bias coil 40. Alternatively, the bias current Ibias may be applied from the direct current voltage supply Vcc to the bias coil 40 via a limiting resistor (not illustrated).

Figure 14:
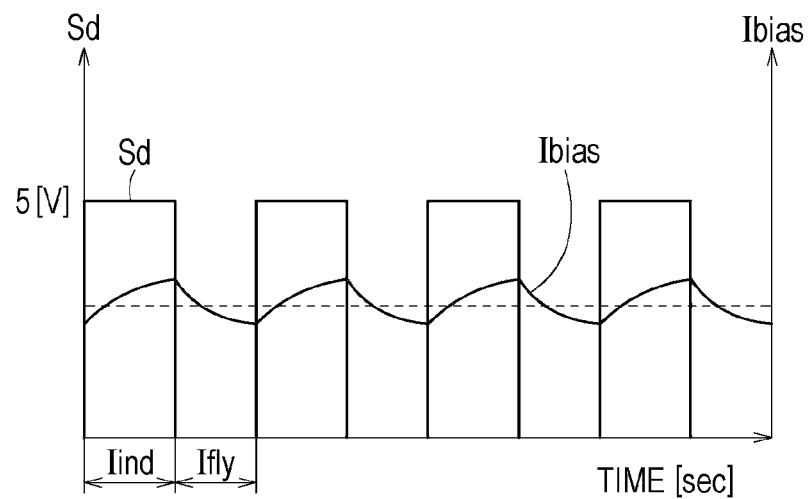
FIG. 14 illustrates the waveforms of a switching signal and a bias current applied to a bias coil.

As illustrated in FIG. 14, by supplying a switching signal Sd of 0 to 5 [V] to the base terminal of the switching element 46 and applying the bias current Ibias, which is an average current of an inductive current Iind and the freewheeling current Ifly, to the bias coil 40, the power consumption of the direct current voltage supply Vcc can be reduced.

More specifically, as illustrated in FIG. 2, one end of the bias coil 40 is connected to the direct current voltage supply Vcc obtained by stabilizing a battery voltage Vbat using a regulator 36. The other end is connected to the collector terminal of the switching element 46 for application of a bias current. The emitter terminal of the switching element 46 is connected to ground. In addition, the collector terminal is connected to the direct current voltage supply Vcc via a limiting resistor Rc (the resistance value of the limiting resistor Rc is also referred to "Rc") and the free wheel diode 48.

Furthermore, the base terminal of the switching element 46 for application of a bias current is driven using the switching signal (the drive signal) Sd, which is a PWM signal having a frequency outside an audible frequency range (e.g., 20 [kHz]). By changing the duty of the PWM of the switching signal Sd, the magnitude of the bias current Ibias, that is, a direct current value (an average current value) can be set.

That is, when the switching signal Sd is ON (at a high level), the switching element 46 is turned on. Thus, the inductive current Iind flows from the direct current voltage supply Vcc to ground GND via the bias coil 40 and the switching element 46. In contrast, when the switching signal Sd is OFF (at a low level), the freewheeling current Ifly flows from the bias coil 40 in a closed circuit formed from the limiting resistor Rc, the free wheel diode 48, and the bias coil 40 due to the stored energy in the form of the inductance of the bias coil 40. The magnitude of the bias current Ibias is the same as a DC component current obtained by averaging the inductive current Iind and the freewheeling current Ifly in accordance with the duty.

The detection coils A to D are wound around the outer periphery of the bias coil 40 that is wound inside. In reality, these coils are wound around a resin bobbin and are disposed as the coil assembly 50 (refer to FIG. 4).

As illustrated in FIG. 2, both ends of each of the detection coils A to D are connected to the torque detection circuit 20A serving as a steering torque signal generating unit disposed inside the interface circuit 20. More specifically, one end of the detection coil A is connected to the direct current voltage supply Vcc via the damping resistor Ra (the resistance value of the damping resistor Ra is also referred to as "Ra"), and the other end is connected to one end of the detection coil C. The other end of the detection coil C is connected to the collector terminal of the switching element 34. In addition, the other end of the detection coil C is connected to the direct current voltage supply Vcc via a resistor Rb (the resistance value of the resistor Rb is also referred to as "Rb") and a fly wheel diode 54. One end of the detection coil D is connected to the direct current voltage supply Vcc via the damping resistor Ra, and the other end is connected to one end of the detection coil B. The other end of the detection coil B is connected to the collector terminal of the switching element 34. In addition, the other end of the detection coil B is connected to the direct current voltage supply Vcc via the resistor Rb and a fly wheel diode 54.

When the switching element 34 is driven using the square wave signal PVF, the middle point voltage V1 appears at the middle point 51 between the detection coil A and the detection coil C, and the middle point voltage V2 appears at the middle point 52 between the detection coil B and the detection coil D. The middle point voltages V1 and V2 are processed by the bottom hold circuits 31 and 32, respectively.

Figure 15:
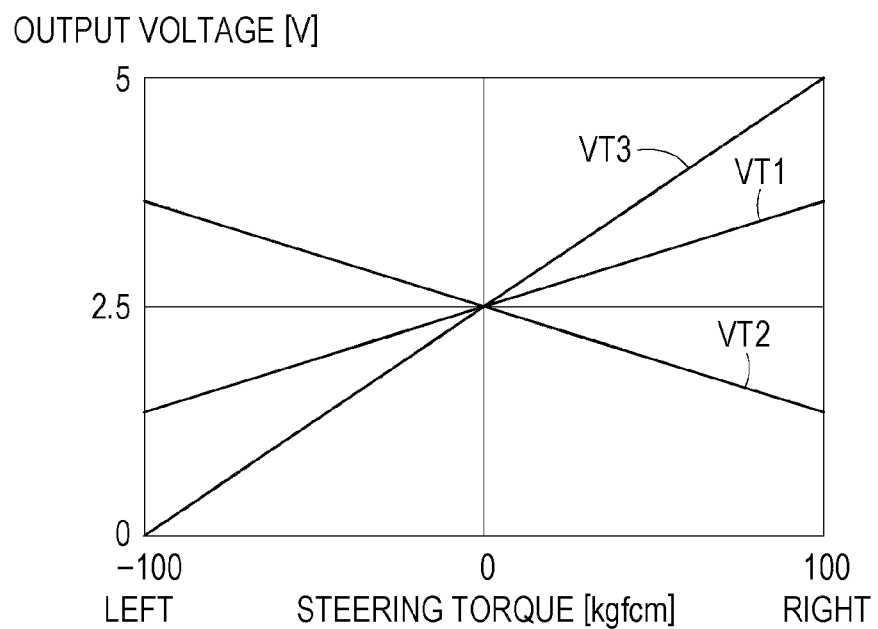
FIG. 15 is a characteristic diagram illustrating a relationship between a steering torque signal (an output voltage) and the steering torque.

In this manner, the output voltage VT1 and the output voltage VT2 illustrated in FIG. 15 are detected. Subsequently, the steering torque signal VT3 is obtained on the basis of an output voltage (a differential output) "VT1−VT2" of the differential amplifier 33. The steering torque signal VT3 is output to the electronic control unit 22. The electronic control unit 22 calculates the target electric current Itar to be applied to the motor 24 on the basis of the steering torque signal VT3.

Figure 16:
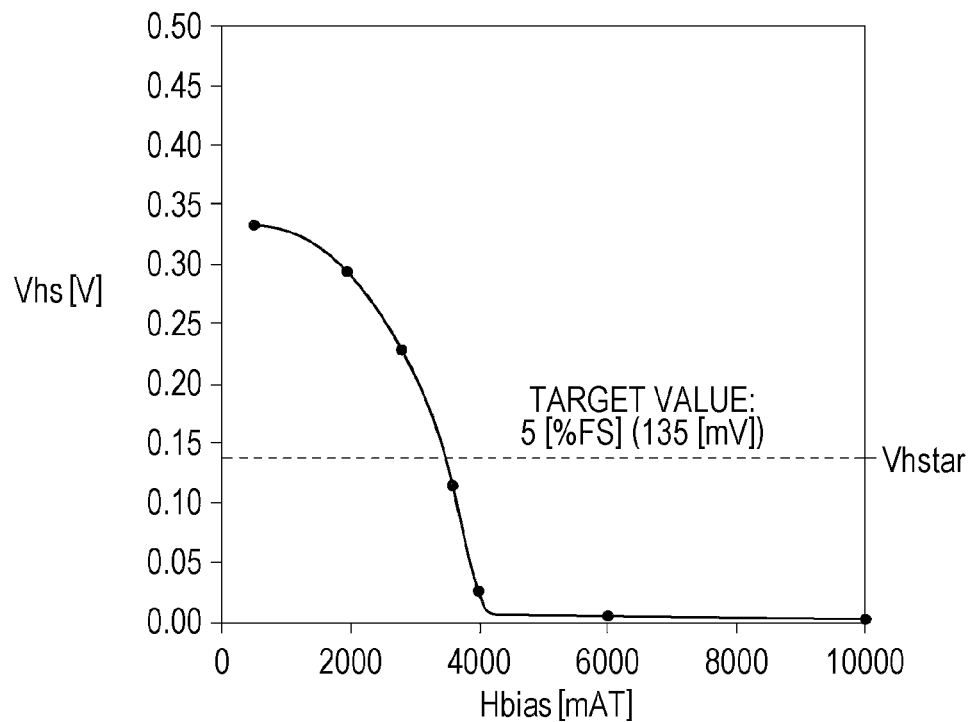
FIG. 16 is a characteristic diagram illustrating a relationship between the magnitude of the bias magnetic field and a hysteresis voltage.

The result of an experiment for obtaining a relationship between the magnitude of the bias magnetic field Hbias and the hysteresis voltage Vhs of the steering torque signal VT3 obtained when the input torque is zero after an excessive torsion torque Tex of ±250 [Nm] is applied is illustrated in FIG. 16. As can be seen from FIG. 16, the hysteresis voltage Vhs [V] of the steering torque signal VT3 decreases with increasing bias magnetic field Hbias [mAT], and the hysteresis voltage Vhs is substantially zero when Hbias=4000 [mAT]. According to the present exemplary embodiment, a magnetic field having a strength of 4000 [mAT] is applied to each of the portions of the detection coils A to D with a slight allowance for the bias magnetic field Hbias that achieves a target hysteresis voltage Vhstar (135 [mV] which is 5 [% FS] of the voltage when 10 Nm of the normal use range is full-scaled).

As illustrated in FIG. 2, by separating the bias coil 40 from each of the detection coils A to D, the hysteresis Hs occurring after the excessive torsion torque Tex is applied can be reduced without decreasing the detection sensitivity.

Decrease in Sensitivity in Existing Technology

The inventors found that a decrease in the sensitivity occurs when the bias magnetic field Hbias is generated using the detection coils 341 to 344 in the magnetostrictive torque sensor 310 according to existing technology illustrated in FIG. 24 is described below.

As illustrated in FIG. 24, the direct current voltage supply Vcc is applied to the detection coils 341 to 344, and the switching element 334 is driven using the square wave signal PVF. At that time, the middle point voltage V1 appears at a middle point between the detection coils 341 and 343, and the middle point voltage V2 appears at a middle point between the detection coils 342 and 344. The middle point voltages V1 and V2 are signal-processed via the bottom hold circuits 331 and 332 so as to detect the output voltage VT1 and the output voltage VT2, respectively. Thus, the steering torque signal VT3 is obtained.

At that time, in order to generate a desired bias magnetic field Hbias using a magnetic field generated by the detection coils 341 to 344 and a bias current Ibiasp flowing through the detection coils 341 to 344, the number of turns of a coil of each of the detection coils 341 to 344 is increased.

Figure 17:
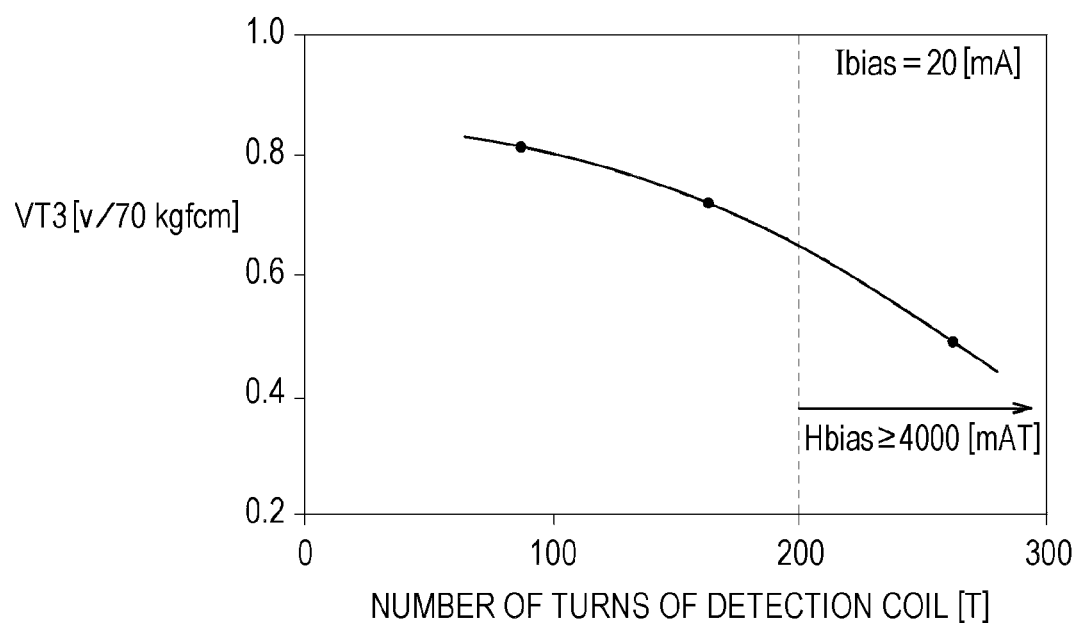
FIG. 17 is a characteristic diagram indicating a decrease in the sensitivity of the steering torque signal with increasing number of turns of the detection coil.

As illustrated in FIG. 17, the sensitivity of the steering torque signal VT3 [V/70 kgfcm] decreases as the number of turns [T] of each of the detection coils 341 to 344 increases.

Figure 18:
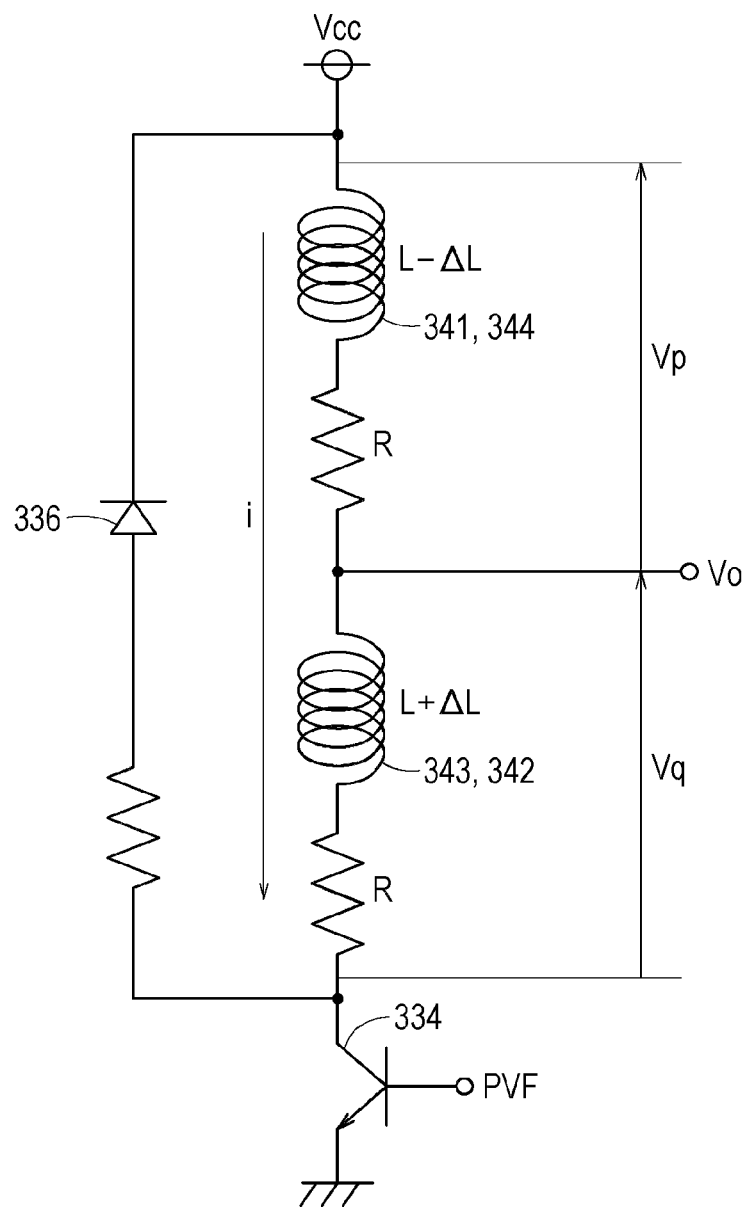
FIG. 18 is an equivalent circuit diagram indicating an increase and a decrease in the inductance and a resistance value of the detection coil.

The reason for that is described with reference to FIG. 18. Let L be the inductance of the winding wire of each of the detection coils 341 to 344. Let R be the resistance value (the floating resistance value) of the winding wire of each of the detection coils 341 to 344. Let ΔL be the inductance component varying in accordance with the steering torque. Let i be an electric current flowing through each of the detection coils 341 to 344. Let Vcc be a power supply voltage. Let Vo be the middle point voltage at a middle point between the detection coils 341 and 343 connected in series.

In reality, the torque is detected by bottom-holding the middle point voltage V0 (note that each of the middle point voltages V1 and V2 is also referred to as a "middle point voltage V0"). Accordingly, a variation of the middle point voltage V0 is the same as the sensitivity.

As can be seen from an equivalent circuit diagram in FIG. 18, the middle point voltage V0 can be calculated as follows:

$$Vo = Vcc \times Vq/(Vp + Vq) \quad (1)$$

$$= Vcc\left\{(L+\Delta L)\left(\frac{di}{dt}\right) + R \cdot i\right\} \div$$

$$\left[\begin{array}{l}\left\{(L+\Delta L)\left(\frac{di}{dt}\right) + R \cdot i\right\} + \\ \left\{(L-\Delta L)\left(\frac{di}{dt}\right) + R \cdot i\right\}\end{array}\right]$$

$$= (Vcc/2) \times \left\{(L+\Delta L)\left(\frac{di}{dt}\right) + R \cdot i\right\} \div$$

$$\left\{L\left(\frac{di}{dt}\right) + R \cdot i\right\}$$

$$= (Vcc/2) \times \left[1 + \left\{\Delta L\left(\frac{di}{dt}\right)\right\} \Big/ \left\{L\left(\frac{di}{dt}\right) + R \cdot i\right\}\right]$$

$$= (Vcc/2) \times \left[\begin{array}{l}1 + \left\{\Delta\mu(\xi \cdot \pi \cdot a^2 \cdot n^2/l)\left(\frac{di}{dt}\right)\right\} \div \\ \left\{\mu(\xi \cdot \pi \cdot a^2 \cdot n^2/l)\left(\frac{di}{dt}\right) + R \cdot i\right\}\end{array}\right],$$

where Rd, Re≪R.

As can be seen from equation (1), the variation of the middle point voltage V0 corresponds to a component added to the value "1" in brackets.

That is, the variation={Δμ(ξ·π·a²·n²/l)(di/dt)}÷{μ (ξ·π·a²·n²/l)(di/dt)+R·i}.

Herein, μ represents the magnetic permeability of the magnetostrictive film mf, μΔ represents the magnetic permeability of the magnetic permeability varying in accordance with the steering torque, ξ represents Nagaoka coefficient, a represents the radius of each of the detection coils 341 to 344, n represents the number of turns [T], and l represents the length of each of the detection coils 341 to 344. Note that l is a constant value. Accordingly, if a resistance value R of each of the detection coils 341 to 344 is zero, the variation=$\Delta\mu/\mu$ regardless of the number of turns n, the length l, and the radius a of each of the detection coils 341 to 344. That is, the variation is the same as the variation of the magnetic permeability of the magnetostrictive film mf.

However, as can be seen, if the resistance value R in the denominator in the second term of equation (1) is larger, that is, if the number of turns n increases, the variation decreases due to the effect of the resistance value R.

For the reasons described above, the sensitivity decreases in existing technology.

Other Exemplary Embodiments

Figure 19:
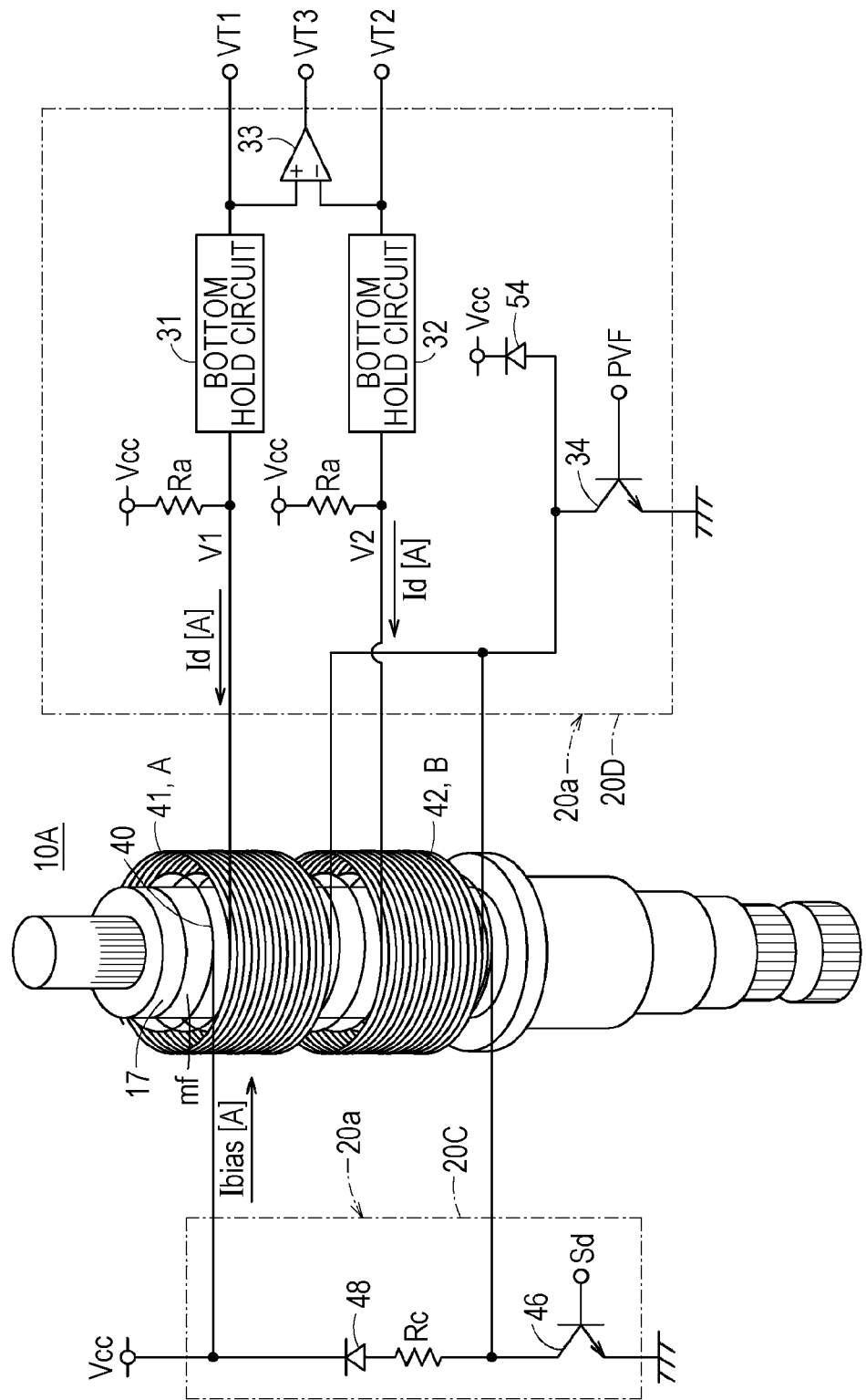
FIG. 19 illustrates a circuit connection among a magnetostrictive torque sensor, a bias current generation circuit, and a torque detection circuit according to another exemplary embodiment.
Figure 20:
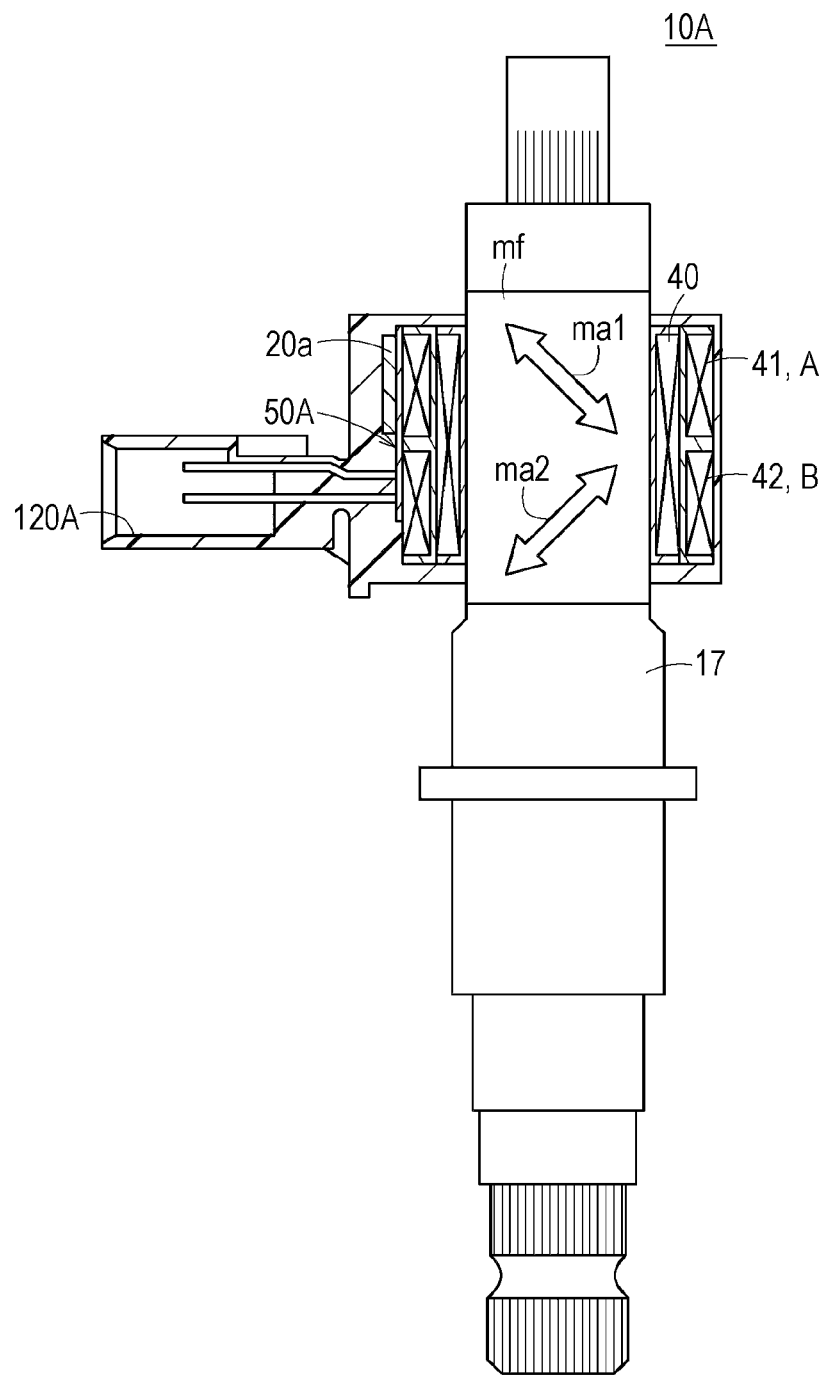
FIG. 20 illustrates the configuration of a magnetostrictive torque sensor according to another exemplary embodiment in detail.

FIGS. 19 and 20 illustrate a magnetostrictive torque sensor 10A according to another exemplary embodiment.

FIG. 19 is a principle diagram of a bias coil 40 and detection coils A and B. The bias coil 40 is wound around a magnetostrictive film mf provided on a sensor shaft 17 throughout the length of the magnetostrictive film mf. In reality, a coil wound around a bobbin made of resin is disposed as a coil assembly 50A (refer to FIG. 20). A DC component current Ibias is applied from a bias path provided in a bias current generation circuit 20C disposed in an interface circuit 20a to the bias coil 40 and, thus, a bias magnetic field Hbias is generated. To generate the DC component current Ibias, a circuit including a switching element 46 and a free wheel diode 48 may be employed so that a freewheeling current Ifly (a DC component current) flows in the detection coils A and B using the inductance components of the detection coils A and B, as illustrated in FIG. 19. Alternatively, a direct current may be applied from a direct current voltage supply Vcc to the detection coils A and B via a limiting resistor (not illustrated). By using the freewheeling current Ifly as illustrated in FIG. 19, consumption of power supplied from the direct current voltage supply Vcc can be reduced.

The detection coils 41 (A) and 42 (B) are wound around the outer periphery of the bias coil 40 that is wound inside. In reality, these coils are wound around a resin bobbin and are disposed as a coil assembly 50A. Both ends of each of the detection coils A and B are connected to a torque detection circuit 20D disposed inside an interface circuit 20a. In addition, the direct current voltage supply Vcc is connected to each of the detection coils A and B via a resistor Ra. A connection point between the detection coils A and B is connected to ground via the switching element 34, which is driven using the square wave signal PVF. If a steering torque is applied, the inductance of each of the detection coils A and B varies. Accordingly, if, for example, the torque is applied to the right, an inductance L of the detection coil A changes from L to L+$\Delta$L, and an inductance L of the detection coil B changes from L to L−$\Delta$L. In addition, since an electric current that flows through the resistor Ra and the detection coils A and B varies, the voltages (voltages V1 and V2) at a connection point between the resistor Ra and the detection coil A and a connection point between the resistor Ra and the detection coil B vary. The voltages V1 and V2 are signal-processed by the bottom hold circuits 31 and 32 to detect output voltages VT1 and VT2, respectively. Thereafter, a steering torque signal VT3 is obtained on the basis of the output voltage of the differential amplifier 33 (the differential output "VT1−VT2").

The steering torque signal VT3 is output to the electronic control unit 22, and the target electric current Itar to be applied to the motor 24 is calculated on the basis of the value of the steering torque signal VT3.

FIG. 20 illustrates the configuration (a cross-sectional view) of the magnetostrictive torque sensor 10A according to the present exemplary embodiment in detail. The magnetostrictive torque sensor 10A is formed by plating a Ni65[%]-Fe35[%] film having a thickness of about 30 to about 40 μm on a sensor shaft 17, which is a shaft member formed by heat-processing a steel, such as S45C or SCM420 first. Thus, a magnetostrictive film mf is provided on the sensor shaft 17. Thereafter, a rotational torque is applied about the axis of rotation of the sensor shaft 17, and the magnetostrictive film mf is heated by a radio-frequency heating. After magnetostrictive film mf is cooled, the rotational torque is removed so that anisotropy ma1 and anisotropy ma2 are added.

A coil assembly 50A having a connector 120A formed by integrally resin-molding the bias coil 40, the detection coils 41(A) and 42 (B), and the interface circuit 20a is disposed on the outer periphery of the magnetostrictive film mf.

Since the bias magnetic field Hbias is applied to the magnetostrictive film mf by passing a DC component current through the bias coil 40 that is separated from the detection coils A and B, a sufficient bias magnetic field Hbias can be applied to the magnetostrictive film mf without decreasing the detection sensitivity of the sensor. Thus, the hysteresis generated during application of the excessive torque Tex can be reduced without decreasing the S/N ratio. Accordingly, the magnetostrictive torque sensor 10A having no output variation and high detection accuracy even when the excessive torque Tex caused by a disturbance is applied can be produced. In this manner, when, for example, a wheel of a moving automobile hits a curb and if the excessive torsion torque Tex that significantly exceeds the steering torque generated during normal driving is applied to the steering axle 11, the hysteresis is not generated in the output of the sensor. That is, a variation of the output does not occur. In addition, since noise is low, the S/N ratio increases. Consequently, the steering feel is improved. Furthermore, since the S/N ratio is higher, the malfunction detection threshold value can be set to a smaller value. Thus, even in the event of malfunction, a fail-safe design works.

In column shaft drive EPSs having the magnetostrictive torque sensor 10A in the vicinity of the steering wheel, an electric current that flows when a horn is blown by a driver directly passes through the sensor shaft 17 via the column shaft 16. In the magnetostrictive torque sensor 10A according to the present exemplary embodiment, a negative impact caused by such an electric current can be eliminated, since a sufficient bias magnetic field Hbias is applied by using the bias coil 40.

Summary of Exemplary Embodiments

As described above, the magnetostrictive torque sensor 10 (10A) according to the above-described exemplary embodiments includes the sensor-shaft-17 integrated column shaft 16 serving as a shaft member including the magnetostrictive film mf having the anisotropy ma1 and the anisotropy ma2 added thereto, the multi-turn winding detection coils 41 to 44 (41 and 42) that are wound around the sensor shaft 17 so as to surround the magnetostrictive film mf, and the multi-turn winding bias coil 40 separated from each of the detection coils 41 to 44 (41 and 42) and wound around the sensor shaft 17 so as to surround the sensor shaft 17. The detection current Id, which is an AC component current, is applied to the detection coils 41 to 44 (41 and 42) and, thus, the magnetostrictive film mf is excited. A variation of the magnetic property of the magnetostrictive film mf caused by a change in the torque applied to the column shaft 16 (a variation of the magnetic permeability in the embodiments) is detected by the detection coils 41 to 44 (41 and 42). Thus, the detection coils 41 to 44 may be called as excitation-detection coils. When the detection current Id (the AC component current) is applied to the detection coils 41 to 44 (41 and 42), the DC component current Ibias is applied to the bias coil 40 and, thus, the bias magnetic field Hbias is applied to the magnetostrictive film mf.

At that time, the bias current Ibias, which is a DC component current, may be one of an average electric current obtained when the inductive current Iind and the freewheeling current Ifly are alternately applied to the bias coil 40 and a direct current.

According to the above-described exemplary embodiments, in addition to the detection coils 41 to 44 (41 and 42) that are wound around the sensor shaft 17 so as to surround the magnetostrictive film mf, a DC component current is applied to another multi-turn winding coil that wound around the sensor shaft 17 so as to surround the magnetostrictive film mf and that serves as the bias coil 40. In this manner, the bias magnetic field Hbias is applied to the magnetostrictive film mf. Accordingly, a decrease in the detection sensitivity caused by an increase in the direct current resistive component (the resistance value R in FIG. 18) of the detection coils 341 to 344 of the magnetostrictive torque sensor 310 of the existing technology in which the detection coils 41 to 44 are also used as a bias coil can be prevented. Thus, a sufficient bias magnetic field Hbias can be applied to the magnetostrictive film mf.

Since the decrease in the detection sensitivity is minimized in this manner, the S/N ratio does not decrease. In addition, since a sufficient bias magnetic field Hbias can be applied, the hysteresis of the sensor output occurring when the excessive torsion torque Tex is applied can be reduced. As a result, the magnetostrictive torque sensor 10 (10A) having higher detection accuracy without a variation in the sensor output even when the excessive torsion torque Tex is applied due to a disturbance can be provided.

In such a case, as illustrated in FIGS. 2 and 19, one end of the bias coil 40 is connected to the positive electrode potential of the direct current voltage supply Vcc that generates a DC voltage defined by the negative electrode potential and the positive electrode potential, and the other end is connected to one end of the switching element 46 which is connected to the positive electrode potential via the free wheel diode 48 (the other end of the free wheel diode 48 is connected to the negative electrode potential). By changing the duty of the switching signal Sd in the form of a pulse width modulation signal that switches the switching element 46, the magnitude of the DC component current applied to the bias coil 40 is set.

In this manner, the DC component current applied to the bias coil 40 that applies the bias magnetic field Hbias to the magnetostrictive film mf can be an average current of the inductive current Iind applied from the direct current power supply Vcc to the bias coil 40 when the switching element 46 driven by the pulse width modulation signal is turned on and a freewheeling current that flows through the free wheel diode 48 when the switching element 46 is turned off. Consequently, the power consumed by the direct current power supply can be reduced, as compared with a direct current power supply that continuously supplies an average electric current.

The present disclosure encompasses the electric power steering device 12 using the magnetostrictive torque sensor 10 (10A). According to the electric power steering device 12, since the magnetostrictive torque sensor 10 (10A) having the bias coil 40 separated from the detection coils 41 to 44 (41 and 42) is used for the electric power steering device 12, a decrease in the sensitivity found in existing technology does not occur. In addition, even when, for example, a wheel of a moving vehicle hits a curb and, thus, the excessive torsion torque Tex that significantly exceeds the steering torque during normal driving is applied to the steering axle 11, the hysteresis does not occur in the sensor output and, thus, the sensor output does not vary.

Since the detection sensitivity can be increased more than that in existing technology, the S/N ratio can be increased and, therefore, the steering feel can be improved. In addition, since the S/N ratio is higher, the range of the malfunction detection threshold value set when, for example, four detection coils 41 to 44 are bridge-connected and a voltage appearing at the middle point is determined as the threshold value can be decreased. Accordingly, malfunction can be detected with higher sensitivity.

Note that the present disclosure is not limited to the above-described exemplary embodiments. For example, instead of the magnetostrictive torque sensor 10 according to the exemplary embodiment illustrated in FIG. 4, the bias coil 40 may be disposed outward of the detection coils A to D, as indicated by a magnetostrictive torque sensor 10a according to a modification in FIG. 21. Alternatively, as indicated by a magnetostrictive torque sensor 10b according to another modification in FIG. 22 and a magnetostrictive torque sensor 10c according to still another modification in FIG. 23, the bias coil 40 may be disposed on the sensor shaft 17 at another position in the axis direction.

Figure 21:
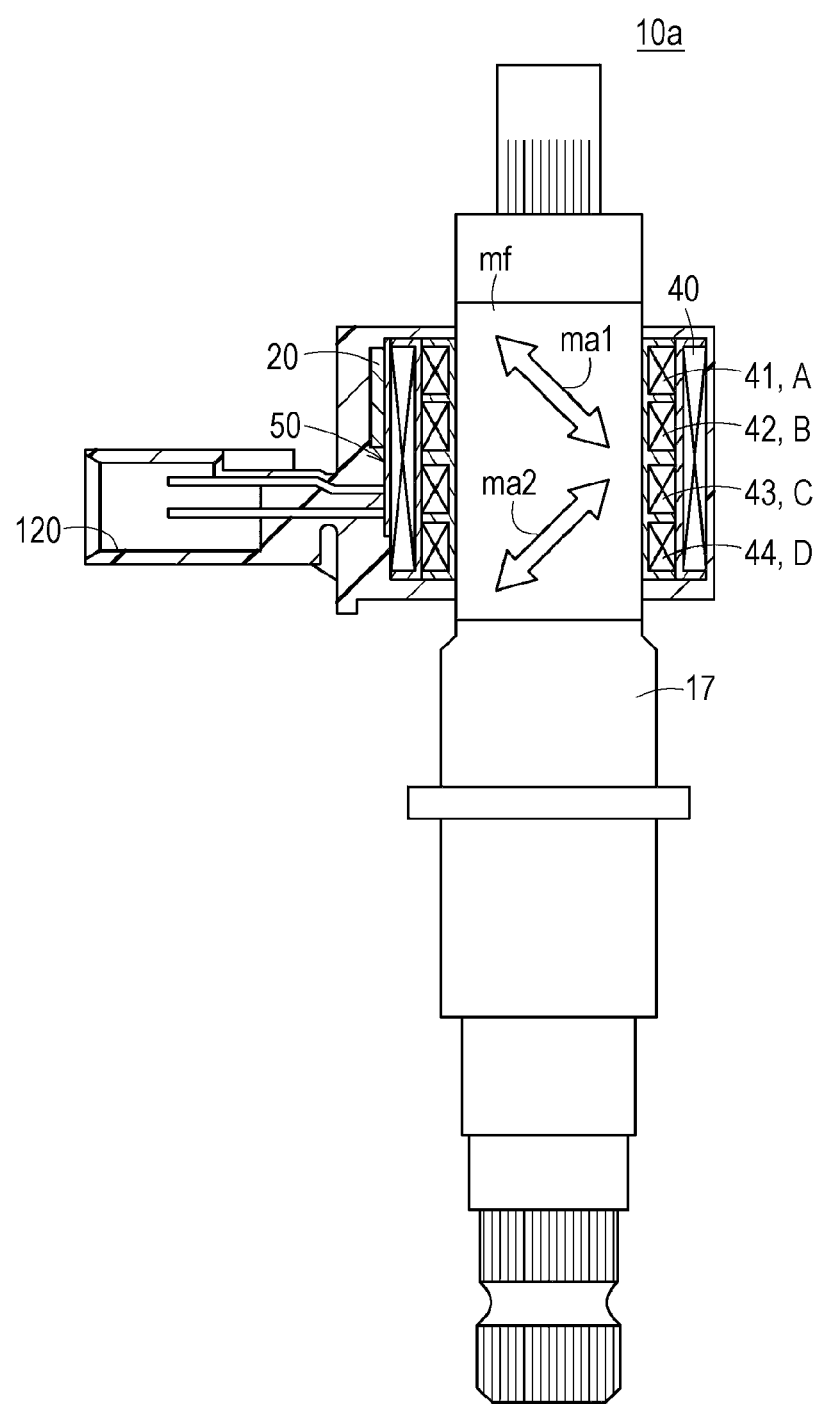
FIG. 21 illustrates the configuration of a magnetostrictive torque sensor according to a modification in detail.
Figure 22:
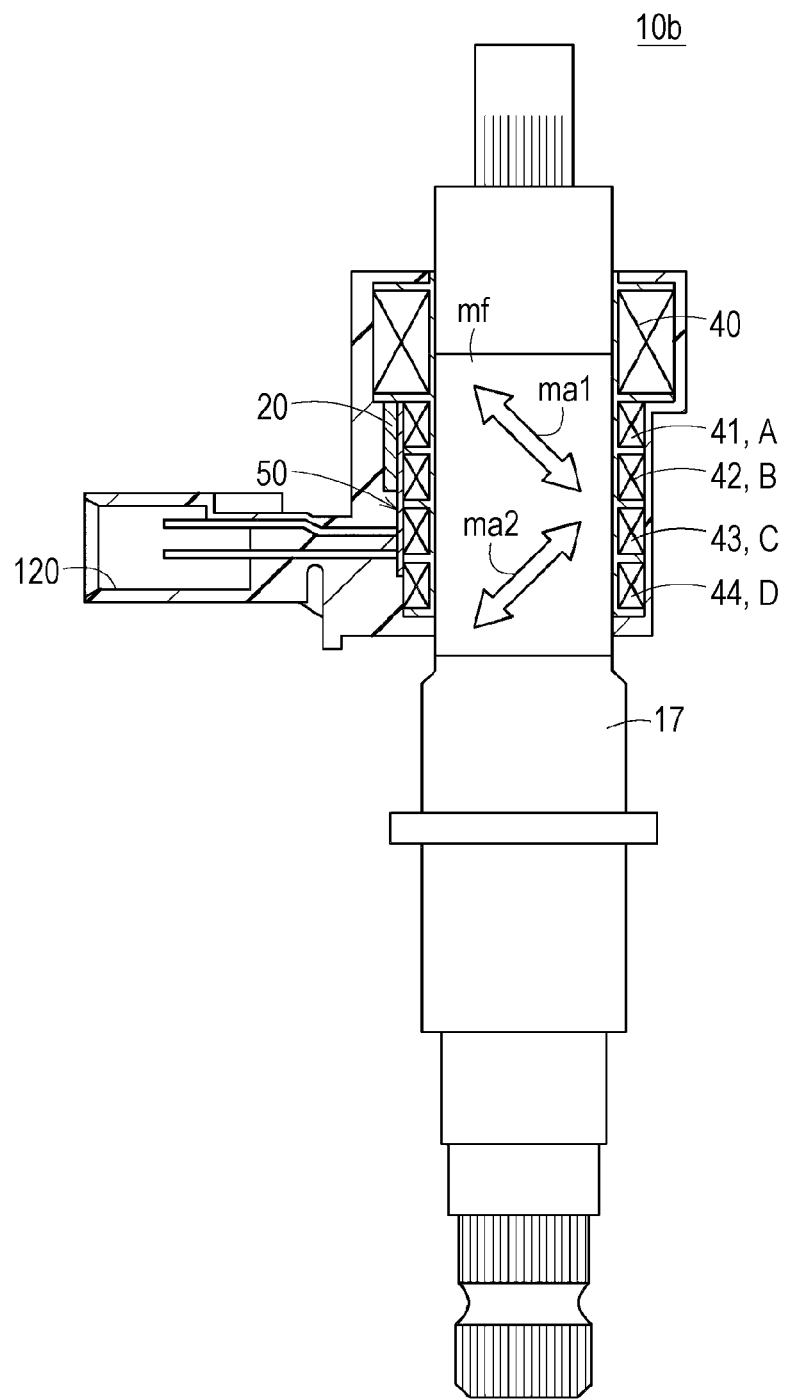
FIG. 22 illustrates the configuration of a magnetostrictive torque sensor according to another modification in detail.
Figure 23:
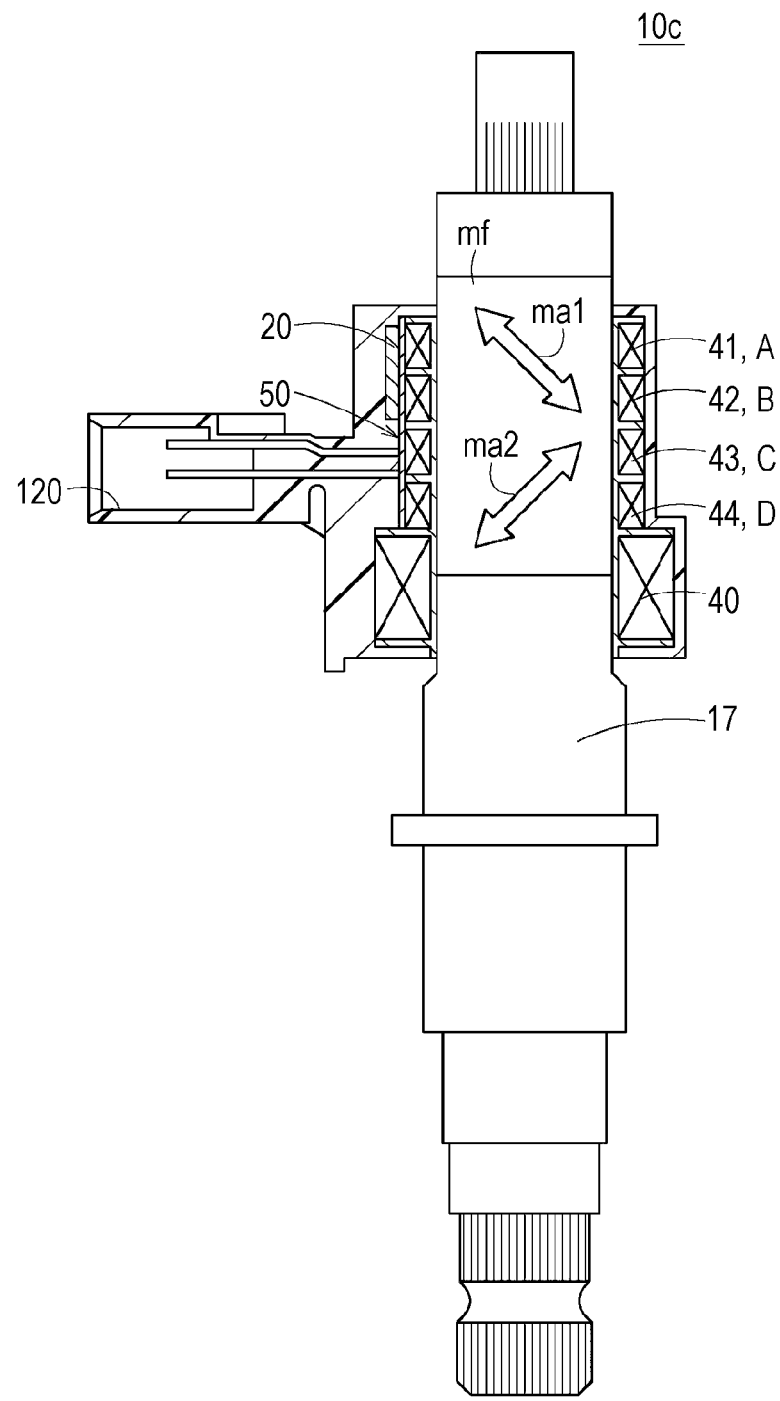
FIG. 23 illustrates the configuration of a magnetostrictive torque sensor according to still another modification in detail.

Similarly, although not illustrated, like the modifications illustrated in FIGS. 21 to 23, instead of the magnetostrictive torque sensor 10A according to the exemplary embodiment illustrated in FIG. 20, the bias coil 40 may be disposed outward of the detection coils A and B or may be disposed on the sensor shaft 17 at another position in the axis direction. In this manner, a variety of configurations based on the descriptions above can be employed. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A magnetostrictive torque sensor comprising:
   a shaft member having a magnetostrictive film, the magnetostrictive film having magnetic anisotropy;
   a plurality of multi-turn winding excitation-detection coils each wound around the shaft member so as to surround the magnetostrictive film, the excitation-detection coils exciting the magnetostrictive film when an AC component current is applied thereto and detecting a variation of a magnetic property of the magnetostrictive film that varies in accordance with a torque applied to the shaft member; and
   a multi-turn winding bias coil wound around the shaft member so as to surround the magnetostrictive film, the bias coil being separated from the excitation-detection coils,
   wherein when the AC component current is applied to the excitation-detection coils, a DC component current is applied to the bias coil so that a bias magnetic field is applied to the magnetostrictive film.

2. The magnetostrictive torque sensor according to claim 1, further comprising:
- a direct current power supply that generates a direct current voltage defined by a negative electrode potential and a positive electrode potential; and
- a switching element having one end connected to the negative electrode potential and the other end connected to the positive electrode potential via a free wheel diode,
- wherein one end of the bias coil is connected to the positive electrode potential and the other end of the bias coil is connected to the other end of the switching element, and
- wherein a magnitude of the DC component current applied to the bias coil is set by changing a duty of a pulse width modulation signal used for switching the switching element.

3. An electric power steering device comprising:
the magnetostrictive torque sensor according to claim 1.

4. The magnetostrictive torque sensor according to claim 1, wherein the excitation-detection coils surround the bias coil.

5. The magnetostrictive torque sensor according to claim 1, wherein the bias coil surrounds the excitation-detection coils.

6. The magnetostrictive torque sensor according to claim 1, wherein bias coil is disposed at a position different from the excitation-detection coils along an axial direction of the shaft member.

7. The magnetostrictive torque sensor according to claim 1, further comprising a bias current generation circuit applying the DC component current to the bias coil to apply the bias magnetic field to the magnetostrictive film.

8. The magnetostrictive torque sensor according to claim 1, further comprising a torque detection circuit applying the AC component current to the excitation-detection coils and detecting the variation of the magnetic property of the magnetostrictive film in accordance with the torque applied to the shaft member.

9. A steering torque detecting method using a magnetostrictive torque sensor comprising
- a shaft member having a magnetostrictive film, the magnetostrictive film having magnetic anisotropy,
- a plurality of multi-turn winding excitation-detection coils each wound around the shaft member so as to surround the magnetostrictive film, the excitation-detection coils exciting the magnetostrictive film when an AC component current is applied thereto and detecting a variation of a magnetic property of the magnetostrictive film that varies in accordance with a torque applied to the shaft member, and
- a multi-turn winding bias coil wound around the shaft member so as to surround the magnetostrictive film, the bias coil being separated from the excitation-detection coils, wherein the method comprising:

applying a DC component current to the bias coil to apply a bias magnetic field to the magnetostrictive film; and;

applying the AC component current to the excitation-detection coils to detect the variation of the magnetic property of the magnetostrictive film in accordance with the torque applied to the shaft member.

* * * * *